(12) United States Patent
Burd et al.

(10) Patent No.: US 6,990,653 B1
(45) Date of Patent: Jan. 24, 2006

(54) SERVER-SIDE CODE GENERATION FROM A DYNAMIC WEB PAGE CONTENT FILE

(75) Inventors: Gary S. Burd, Kirkland, WA (US); Kenneth B. Cooper, Seattle, WA (US); Scott D. Guthrie, Redmond, WA (US); David S. Ebbo, Redmond, WA (US); Mark T. Anders, Bellevue, WA (US); Ted A. Peters, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/573,768

(22) Filed: May 18, 2000

(51) Int. Cl.
G06F 9/44 (2006.01)

(52) U.S. Cl. ............... 717/108; 717/100; 717/107
(58) Field of Classification Search ........... 717/100, 717/106–108
See application file for complete search history.

(56) References Cited

U.S. PATENT DOCUMENTS

| | | | |
|---|---|---|---|
| 5,748,890 A | 5/1998 | Goldberg et al. | |
| 5,812,996 A | 9/1998 | Rubin et al. | |
| 5,835,712 A | 11/1998 | DuFresne | |
| 5,897,622 A | 4/1999 | Blinn et al. | |
| 5,940,075 A | 8/1999 | Mutschler, III et al. | |
| 5,961,601 A | 10/1999 | Iyengar | |
| 5,983,227 A | 11/1999 | Nazem et al. | |
| 6,014,666 A | 1/2000 | Helland et al. | |
| 6,032,207 A | 2/2000 | Wilson | |
| 6,076,108 A | 6/2000 | Courts et al. | |
| 6,108,717 A | 8/2000 | Kimura et al. | |
| 6,178,461 B1 * | 1/2001 | Chan et al. | 709/247 |
| 6,185,608 B1 | 2/2001 | Hon et al. | |
| 6,205,480 B1 | 3/2001 | Broadhurst et al. | |

(Continued)

FOREIGN PATENT DOCUMENTS

| | | |
|---|---|---|
| WO | WO 98 21651 | 5/1998 |
| WO | WO 98 44695 A | 10/1998 |
| WO | WO 99 34288 A | 7/1999 |

OTHER PUBLICATIONS

Davulcu, Hasan, Freire, Juliana, Kifer, Michael, "A Layered Architecture for Querying Dynamic Web Content", p. 491–502, ACM 1999 retrived from ACM Portal Database Oct. 30, 2003.*

Kitayama, Furmihiko, Hirose, Shin–ichi, Kondoh, Goh, "Design of a Framework for Dynamic Content Adaption to Web–Enabled Terminals and Enterprise Applications", p. 72–79, 1999 IEEE, retrieved from IEEE database Oct. 30, 2003.*

Custer, Helen; "Inside Windows NT"; Microsoft Press 1993; pp. 74–81.

Frost, Jim; "Windows NT Security"; May 4, 1995; 7 pages; http://world.std.com/~jimf/papers/nt–security–nt/security.html.

Holmes, John W.; e–Mail response to question regarding GET/POST.HTTP request, extracted from Google's News groups, php.general, Nov. 11, 2002.

(Continued)

Primary Examiner—Tuan Dam
Assistant Examiner—Mary Steelman
(74) Attorney, Agent, or Firm—Microsoft Corporation

(57) ABSTRACT

A method and apparatus to create an intermediate language or source code file from a server-side resource or dynamic web page file. The source code can then be compiled into an executable class allowing for rapid generation of web page control objects that perform server-side functions, including the rendering of client responses. The code generation scheme of the present invention is capable of creating control objects connected in a hierarchy to handle event processing and the setting of attributes to the specific objects.

22 Claims, 11 Drawing Sheets

U.S. PATENT DOCUMENTS

| | | | |
|---|---|---|---|
| 6,212,192 B1 | | 4/2001 | Mirashrafi et al. |
| 6,230,160 B1 | * | 5/2001 | Chan et al. ............. 707/103 X |
| 6,247,044 B1 | * | 6/2001 | Gosling et al. ............. 709/203 |
| 6,253,228 B1 | | 6/2001 | Ferris et al. |
| 6,351,767 B1 | | 2/2002 | Batchelder et al. |
| 6,370,561 B1 | | 4/2002 | Allard et al. |
| 6,373,841 B1 | * | 4/2002 | Goh et al. .................. 370/389 |
| 6,397,253 B1 | | 5/2002 | Quinlan et al. |
| 6,405,241 B2 | * | 6/2002 | Gosling et al. ............. 709/203 |
| 6,460,141 B1 | | 10/2002 | Olden |
| 6,480,894 B1 | | 11/2002 | Courts et al. |
| 6,487,665 B1 | | 11/2002 | Andrews et al. |
| 6,557,038 B1 | | 4/2003 | Becker et al. |
| 6,591,272 B1 | | 7/2003 | Williams |
| 6,622,168 B1 | * | 9/2003 | Datta ......................... 709/219 |
| 2001/0054020 A1 | * | 12/2001 | Barth et al. .................... 705/37 |
| 2002/0008703 A1 | * | 1/2002 | Merrill et al. .............. 345/473 |
| 2003/0009476 A1 | | 1/2003 | Fomenko et al. |
| 2003/0009519 A1 | * | 1/2003 | Gosling et al. ............. 709/203 |
| 2003/0009567 A1 | | 1/2003 | Farouk |
| 2003/0018827 A1 | | 1/2003 | Gutherie et al. |
| 2003/0025728 A1 | * | 2/2003 | Ebbo et al. ................. 345/744 |
| 2003/0028565 A1 | * | 2/2003 | Landsman et al. .......... 707/513 |
| 2003/0074634 A1 | * | 4/2003 | Emmelmann ............... 715/513 |

OTHER PUBLICATIONS

Pyarali, Irfan; O'Ryan, Carlos; Schmidt, Douglas; Wang, Nanbor; Gokhale, Aniruddha S.; Kachroo, Vishal; "Using Priciple Patterns to Optimize Real–Time ORB's" IEEE Concurrency, 2000, pp. 16–25.

Shi, Weisong; Collins, Eli; Karamcheti, Vijay; "Modeling Object Characteristics of Dynamic Web Content"; Proceedings of the IEEE Global Internet Conference, Nov. 2002, 5pgs.

Solomon, David A. "Inside Windows NT, Second Edition"; Microsoft Press 1998; pp. 310–319.

Wu, Dapeng Hou, Yiwci, Thomas; Zhang, Ya–Qin; "Scalable Video Transport over Wireless IP Networks"; IEEE 2000; pp. 1185–1191.

Dobson, Rick; "Data Binding in Dynamic HTML"; DBMS Mar. 1998 pp. 47–52.

Penn, Gerald, Hu, Jianying; Luo; Hengbin; McDonald, Ryan; "Flexible Web Document Analysis for Delivery to Narrow–Bandwidth Devices"; IEEE 2001; pp. 1074–1078.

Anderson, Richard; Homer, Alex; Howard, Rob; Sussman, Dave; "A Preview of Active Server Pages+"; Copyright 2000, Wrox Press, pp. 1–73.

Hovanes, Michael E.; Deal, John R. Grizz; Rowberg, Alan H.; "Seamless Multiresolution Display of Portable Wavelet–Compressed Images" Journal of Digital Imaging, vol. 12, No. 2, suppl 1 (May), 1999, pp 109–111.

Ingham; David B; "W3Objects: A Distributed Object–Oriented Web Server" Object–Oriented Web Servers and data Modeling Workshop, Sixth International World Wide Web Conference, Apr. 7, 1997, Santa Clara, CA 4 pages.

Kunz, T.; El Shentenawy, M.; Gaddah, A.; Hafez, R.; Image Transcoding for Wireless WWW Access; The User Perspective; Multimedia Computing and Netorking 2002, Proceedings of SPIE vol. 467 (2002) pp. 28–33.

"OOP Launches Hammock at JavaOne" http://www.oop.com/pr2000_06_08.jsp?gui=Plain Jun. 8, 2000, 1 page.

"Hammock: Think of it as Swing for the Web"; Jul. 14, 2000; 10 pages.

Hammond, Eric "Hammock Swings through Web interfaces" www.infoworld.com/articles/mt/xml/00/07/17/000717mthammock.xml; Jul. 14, 2000; 3 pages.

Duan, Nick N.; "Distributed Database Access in a Corporate Environment Using Java" Bell Atlantic Corporation, 1996; 8 pages.

Nadamoto, Akiyo; Kondo, Hiroyuki; Tanaka, Katsumi; "WebCarousel: Restructuring Web Search Results for Passive Viewing in Mobile Environments" IEEE 2001 p. 164–165.

"Best Practices for Creating Adaptive User Interfaces with the Mobile Internet Toolkit"; Microsoft Corporation, Jan. 2002; 15 pages.

"Best Practices for the Microsoft Mobile Internet Toolkit Image Control"; Microsoft Corporation, Feb. 2002.

"Alterego Networks Introduces First Mobile Web Server for Enterprises, Telcos and Providers"; Redwood City, CA; Nov. 14, 2000; 3 pages.

"Bluestone Software Layes Foundation for Internet Operating Environment with Total–E–Server . . . " Screaming Media, Business Wire; Jun. 5, 2000; 3 pages.

Stewart, Tony; "The Document as Application: Issues and Implications" GCA XML Europe 1999; pp. 575–599.

Franklin, Keith; "Supercharge Data Binding"; Visual Basic Programmer's Journal, Mar. 2000; 7 pages.

Shapiro, Marc; "A Binding Protocol for Distributed Shared Objects" Presented at 14th International Conference on Distributed Comp. Sys.; Jun. 21–24, 1994; 17 pages.

Article, ColdFusion Web Application Server, update and summary, from Allaire Corp—www@allaire.com.

"A Brief History of Hypertext", from Microsoft Corporation © 1996.

"HTTP Made Really Easy—A Practical Guide to Writing Clients and Servers", by Marshall, Aug. 15, 1997.

"HTML Encyclopedia—The form tag—The HTML element".

"Developing ASP–Based Applications" from Microsoft Corporation © 1996.

European Search Report for EP 01 11 1680.

European Search Report for EP 01 11 1682.

European Search Report for EP 01 11 1678.

European Search Report for EP 01 11 1681.

Esposito, Dino, "Heaven sent," Developer Network Journal, Mar–Apr. 2001, Matt Publishing, UK, No. 23, pp. 18–24.

Chapter 3, "Mechanics of Developing JavaScript Applications," Server– Side Javascript Guide, Online! 1999, pp. 51–108, www.developer.netscape.com/docs/manuals/ssjs1_4/ssjs.pdf>.

Chapter 6, "Session Management Service," Server– Side Javascript Guide, Online! 1999, pp. 125–166, www.developer.netscape.com/docs/manuals/ssjs/1_4/ssjs.pdf>.

Varela et al., "Providing Data on the Web: From Examples to Programs," Second International W W W Conference, Chicago, Oct. 17–21, 1994, pp. 1–9 (1994).

R. McCool, "NCSA httpd," Documentation distributed with the NCSA httpd Web server, NCSA httpd Development Team, pp. 1–4 (1994).

* cited by examiner

```
1   <%@ Page Language="VB" Description="Simple Sample Page" Errorpage="ErrorPage.aspx" %>
2   <html>
3     <script runat=server>
4       Sub AddButton_Click(ByVal Source as Object, By Val E as Event Args)
5         Message.Text = "Add" & UserName.Text
6       End Sub
7       Sub DeleteButton_Click(ByVal Source as Object, By Val E as Event Args)
8         Message.Text = "Delete" & UserName.Text
9       End Sub
10    </script>
11    <body>
12      <form runat="server">
13        User Name:    <input type="Text" id="UserName" runat=server>
14        <br>
15        <button id="AddButton" value="ADD" OnClick="AddButton_Click" runat=server>
16        <button id="DeleteButton" value="DELETE" OnClick="DeleteButton_Click" runat=server>
17        <br><br>
18        <span id="Message" runat=server> </span>
19      </form>
20    </body>
21  </html>
```

```
1   <%@ language="VB" Description="Test of the TableList control" %>
2
3   <script runat=server>
4      public MyData as New DataList
5
6      Overrides Sub Init()
7         MyData.Add "Name1"
8         MyData.Add "Name2"
9         MyData.Add "Name3"
10
11        Set MyList.DataSource = MyData
12     End Sub
13  </script>
14
15  <%%>
16  <wfc:TableList id="MyList" runat=server>
17     <template:ItemTemplate runat=server>
18  <%%>
19        <wfc:Label id="MyLabel" databinding="text:DataItem" runat=server/>
20     </template:ItemTemplate>
21  </wfc:TableList>
```

Fig. 10

```
1   Inherits System.ASP.WebForms.Page
2
3   Dim MyList as TableList
4   Dim __control3 as Label
5
6   public MyData as New DataList
7
8   Overrides Sub Init()
9      MyData.Add "Name1"
10     MyData.Add "Name2"
11     MyData.Add "Name3"
12     Set MyList.DataSource = MyData
13  End Sub
14
15  Public Sub _tmp_aspx0__BuildControl__control0(ByVal __ctrl as ContainerControl)
16     __ctrl.SetRenderMethodDelegate New RenderMethod(AddressOf
17  Me._tmp_aspx0__Render__control0)
18     _tmp_aspx0__BuildControlMyList
19     __ctrl.AddParsedSubControl MyList
20  End Sub
21
22  Public Sub _tmp_aspx0__BuildControlMyList
23     set MyList = new TableList
24     MyList.ID = "MyList"
25     set MyList.ItemTemplate = new CompiledTemplateBuilder(new
26  BuildTemplateMethod(AddressOf me._tmp_aspx0__BuildControl__control2))
27  End Sub
28
29  Public Sub _tmp_aspx0__BuildControl__control2(ByVal __ctrl as ContainerControl)
30     __ctrl.SetRenderMethodDelegate New RenderMethod(AddressOf
31  Me._tmp_aspx0__Render__control2)
32     _tmp_aspx0__BuildControl__control3
33     __ctrl.AddParsedSubControl __control3
34  End Sub
35
36  Public Sub _tmp_aspx0__BuildControl__control3
37     set __control3 = new Label
38     __control3.ID = "MyLabel"
39  End Sub
40
41  Public Sub _tmp_aspx0__Render__control0(ByVal output as HtmlTextWriter,
42  ByVal __container as ContainerControl)
43     Call __container.Controls(0).RenderControl(output)
44     output.Write(""&vbCRLF &""&vbCRLF &"")
45  End Sub
46
47  Public Sub _tmp_aspx0__Render__control2(ByVal output as HtmlTextWriter,
48  ByVal __container as ContainerControl)
49     Call __container.Controls(0).RenderControl(output)
50     output.Write(""&vbCRLF &"   ")
51  End Sub
```

Fig. 11

SERVER-SIDE CODE GENERATION FROM A DYNAMIC WEB PAGE CONTENT FILE

TECHNICAL FIELD

The invention relates generally to a web server framework, and more particularly to server-side code generation to create control objects that process client-side user interface elements of a web page.

BACKGROUND OF THE INVENTION

A typical web browser receives data from a web server defining the appearance and rudimentary behavior of a web page for display on a client system. In a typical scenario, a user specifies a Uniform Resource Locator ("URL"), a global address of a resource on the World Wide Web, to access a desired web site. An example URL is "http://www.microsoft.com/ms.htm". The first part of the example URL indicates a given protocol (i.e., "http") to be used in the communication. The second part specifies the domain name (i.e., "www.microsoft.com") where the resource is located. The third part specifies the resource (i.e., a file called "ms.htm") within the domain. Accordingly, a browser generates an HTTP (HyperText Transport Protocol) request associated with the example URL to retrieve the data associated with ms.htm file within the www.microsoft.com domain. A web server hosting the www.microsoft.com site receives the HTTP request and returns the requested web page or resource in an HTTP response to the client system for display in the browser.

The "ms.htm" file of the example above corresponds to a web page file that includes static HTML (HyperText Markup Language) code. HTML is a plain-text authoring language used to create documents (e.g., web pages) on the World Wide Web. As such, an HTML file can be retrieved from a web server by a client browser which converts the HTML code to actual visual images or audio components and is thus displayed as a web page. On the client computer systems, this process displays the web page content defined by the delivered HTML file. Using HTML, a developer can, for example, specify formatted text, lists, forms, tables, hypertext links, inline images and sounds, and background graphics for display in the browser. An HTML file, however, is a static file that does not inherently support dynamic generation of web page content. Web page content is the HTML code that is returned to the client for display. Dynamic operation of such relates to a server side application that, as a result of processing steps, generates the HTML code prior to sending as opposed to just sending predetermined code to client browser.

In order to handle more complex client-server interaction, server-side application programs have developed to handle more complex client-server interaction, such as the providing of dynamic content, e.g., changing stock prices or traffic information. The server-side application program processes the HTTP request and generates the appropriate HTML code for transmission to the client in an HTTP response. For example, a server-side application program can process query strings and data from Web-based forms provided by the client in HTTP requests to dynamically generate HTML code for transmission in an HTTP response to the client. In essence, the server side application can generate an HTML-type file that is customized based on information in a request from a client. In such a case, there is no static HTML file that is stored on the server; the HTML file is dynamically created at runtime. An exemplary server-side application program may generate HTML code using a sequence of one or more formatted text write operations to a memory structure. Thereafter, the resulting text is transmitted to a client system in an HTTP response, where it is displayed in the browser.

Developing a server-side application program can be a complex task requiring not only familiarity with normal HTML coding that is used to layout a Web page, but also with programming basics, including one or more programming languages (e.g., C++, Perl, Visual Basic, or Jscript). Unfortunately however, many Web page designers are frequently graphics designers and editors, who provide the human touch but often lack programming experience. Thus, there is a need to provide a simplified web page development framework to create web page files that allows those with less programming experience to develop web page interfaces between server side applications and their respective clients. It is desirable, therefore, to provide a development framework to allow a developer to dynamically create and process a web page with minimal programming.

One approach to minimize the programming requirements of dynamic web page generation has been the Active Server Page (ASP) framework, provided by Microsoft Corporation. The ASP framework allows developers to create "ASP" web page files that typically include Visual Basic or Jscript code, as well as other HTML code. The ASP file contains declarations or tags that perform various functions as well as VB script or J script code. These declarations are generally easier to write than writing actual programming code.

During operation, the HTTP request specifies the ASP file as the desired resource and, thereafter, the ASP file is used to generate the resulting HTML code in the HTTP response to the client. Furthermore, an ASP file may reference pre-developed or third party client-side library components (e.g., client-side ACTIVEX controls) as well as data bases or other third party applications to ease a given application programming efforts.

The simplified ASP web page file must be converted at runtime to a script that can be interpreted by a script engine. The script engine typically performs the various declaration-type commands in the ASP file in a consecutive or synchronous manner to achieve the desired result. Compared to files that are compiled and stored as executable files, script files run by script engines are generally slower since the script engine must perform an interpretation function rather than simply running the file.

One particular problem with compiling a script file into an executable file is that there is or maybe a combination of various languages in the script file. For example, the script file may include components written in HTML and others written in Visual Basic. The script engine uses various operations to interpret these elements at runtime, but no compilers exist to translate the different language components to a single language, i.e., a single source code file. Moreover, in the current server-side application frameworks, the programming required to dynamically manage client-side user interface elements (e.g., text boxes, list boxes, buttons, hypertext links, images, sounds, etc.) within server-side applications can still require sophisticated programming skills. As these server-side processes become more complex, script engines will not be able to continuously keep up with the demands.

For these and other reasons the present invention has been made.

SUMMARY OF THE INVENTION

The present invention relates to a code generation method and apparatus to create an intermediate language or source code file from a server-side resource, the source code file then being compiled into an executable class. The executable class allows for rapid generation of web page control objects that perform server-side functions, including the rendering of client responses. In an embodiment of the present invention, the code generation scheme is capable of creating control objects connected in a hierarchy to handle event processing and the setting of attributes to the specific objects. Furthermore, the code generation method is also capable of connecting objects that have been declared using a template.

In accordance with preferred aspects, the present invention relates to a method of creating a class in a server computer system memory. The class is used by the server computer system to create server-side objects for dynamically rendering web page content and the web page content is delivered to a client-side computer system and displayed as a web page on the client computer system. In operation, the server computer system receives a request from the client computer system for the web page and wherein the request identifies a dynamic web page content file. The server computer creates a data model to store elements of the dynamic web page content file, evaluates the data model and generates a source code file related to the dynamic web page content file based on the evaluation of the data model. Once the source code file is created, the source code file is compiled to create a compiled class in memory. The process generally ends with the return of a class reference to the server computer system which enables the server computer system to use the class.

In accordance with other preferred embodiments, the method stores the class in cache memory on the server computer system. Once stored in cache memory, multiple server side page objects can be instantiated from the singular compiled class and the original resource is not used again. Each time a request for the web page is received, the server computer system determines whether a compiled class for that dynamic web page content file resides in memory. If the requested class does not exist in memory, it is created. Once the class is located, the server computer system instantiates server-side processing objects from that class to dynamically generate web page content. The web page content is then rendered and conducted to the client computer system.

In accordance with yet other embodiments of the present invention, the method step of evaluating the data model involves the recursive traversal of the data model during a plurality of passes. During each pass, source code is generated and written to the source code file based on the evaluation of the data model during that pass. The data model is constructed using data structures that linked in a hierarchical manner.

An embodiment of a computer program product in accordance with the present invention includes a computer program storage medium readable by a computer system and encoding a computer program for executing a computer process of creating a compiled class in memory on the server computer. The compiled class is used to instantiate server-side processing object to render a response corresponding to a requested web page to be displayed on a client computer system. An alternative embodiment of a computer program product in accordance with the present invention includes a computer data signal embodied in a carrier wave by a computing system and encoding a computer program for creating the compiled class on the server.

BRIEF DESCRIPTION OF THE DRAWINGS

FIG. 4 illustrates an exemplary dynamic content file (e.g., an ASP+ page) in an embodiment of the present invention.

FIG. 10 illustrates an example of an ASP+ page that can be parsed in accordance with the present invention.

FIG. 11 illustrates an example of a source code file created using the present invention wherein the initial ASP+ file shown in FIG. 10.

DETAILED DESCRIPTION OF THE INVENTION

An embodiment of the present invention relates to a method of creating a compiled class in memory for a particular web page defined by a dynamic web page content resource or file. Creating the compiled class involves creating a source code file from the web page file. The source code file is then compiled into the class. Once a compiled class exists in memory, a page object can be instantiated to render the response which is sent back to a client for display. The page object generally involves server-side control objects for processing and generating client-side user interface elements which are displayed on the web page. Furthermore, a hierarchy of server-side control objects can be declared in the web page file wherein these objects ultimately cooperate to generate the resulting authoring language code, such as HTML, for display of the web page on the client.

Figure 1:
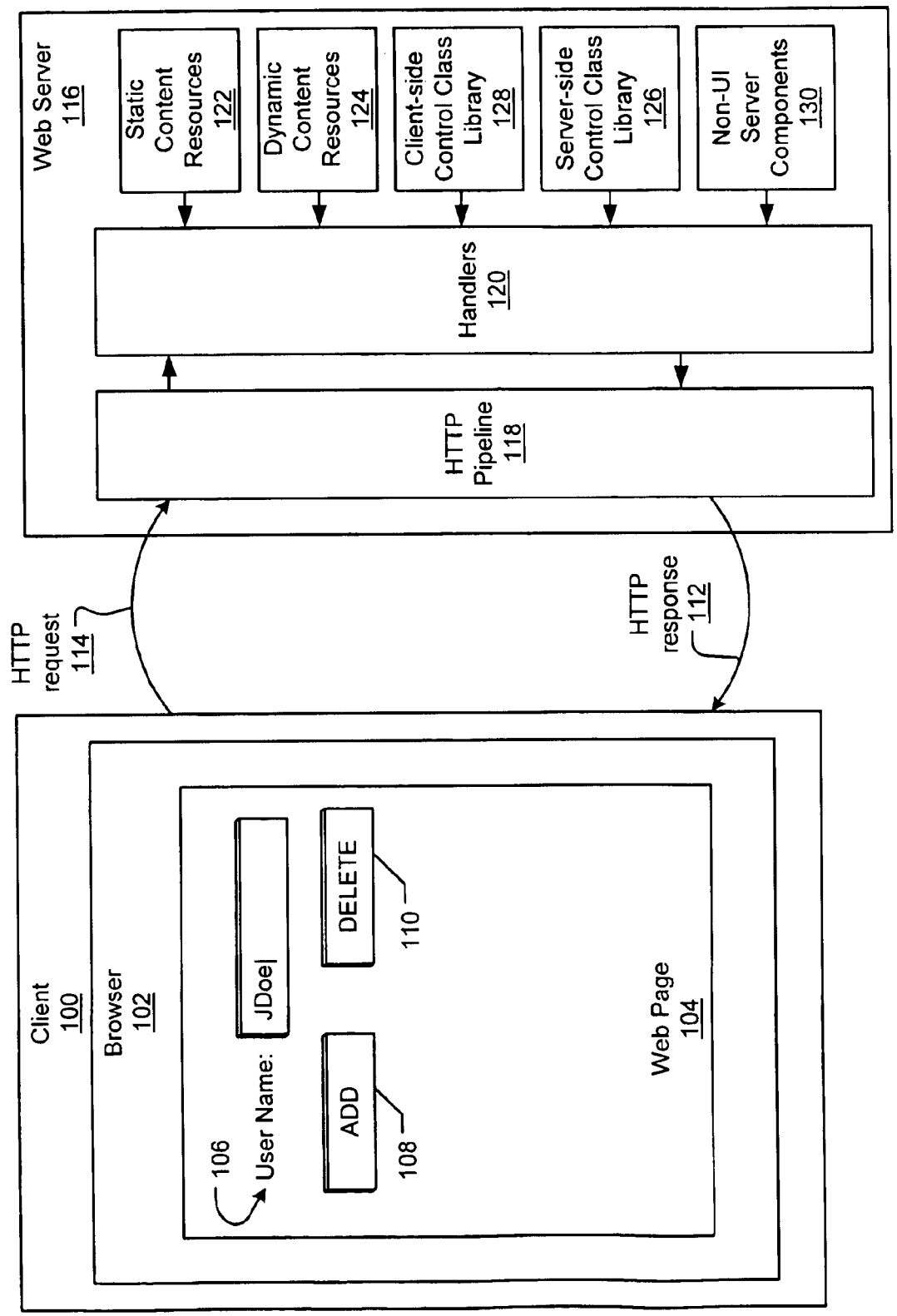
FIG. 1 illustrates a web server for dynamically generating web page content for display on a client in an embodiment of the present invention.

FIG. 1 illustrates a web server for dynamically generating web page content for display on a client in an embodiment of the present invention. A client 100 executes a browser 102 that displays a web page 104 on a display device of the client 100. The client 100 includes a client computer system having a display device, such as a video monitor (not shown). An "INTERNET EXPLORER" browser, marketed by Microsoft Corporation, is an example of a browser 102 in an embodiment of the present invention. Other exemplary browsers include without limitation "NETSCAPE NAVIGATOR" and "MOSAIC". The exemplary web page 104 includes a text box control 106 and two button controls 108 and 110. The browser 102 receives HTML code in the HTTP response 1 12 from a web server 1 16 and displays the web page as described by the HTML code. Although HTML is described with reference to one embodiment, other authoring languages, including without limitation SGML (Standard Generalized Markup Language) and XML (eXtensible Markup Language), are contemplated within the scope of the present invention.

The communications between the client 100 and the web server 116 are conducted using a sequence of HTTP requests 114 and HTTP responses 112. Although HTTP is described with reference to one embodiment, other transport protocols, including without limitation S-HTTP, are contemplated within the scope of the present invention. On the web server 116, an HTTP pipeline module 118 receives HTTP request 114, resolves the URL, and invokes an appropriate handler 120 for processing the request. In an embodiment of the present invention, a plurality of handlers 120 to handle different types of resources are provided on the web server 116.

For example, if the URL specifies a static content file 122, such as an HTML file, a handler 120 accesses the static content file 122 and passes the static content file 122 back through the HTTP pipeline 118 for communication to the client 100 in an HTTP response 112. Alternatively, in an embodiment of the present invention, if the URL specifies a dynamic content resource or file 124, such as an "ASP+" (Active Server Page+) page, a handler 120 accesses the dynamic content file 124, processes the contents of the dynamic content file 124, and generates the resulting HTML code for the web page 104. Generally, a dynamic content resource, such as file 124, is a server-side declaration datastore that can be used to dynamically generate the authoring language code that describes a web page to be displayed on a client. The HTML code for the web page is then passed through the HTTP pipeline 118 for communication to the client 100 in an HTTP response 112.

During its processing, a handler 120 can also access libraries of pre-developed or third-party code to simplify the development effort. One such library is a server-side class control library 126, from which the handler 120 can instantiate server-side control objects for processing user interface elements and generating the resultant HTML data for display of a web page. Another such library is a client-side control class library 128. In an embodiment of the present invention, one or more server-side control objects map to one or more user interface elements, visible or hidden, on the web page described in the dynamic content file 124.

A handler 120 also has access to one or more non-user-interface server components 130 that execute on the web server 116 or on another accessible web server. A non-user-interface server component 130, such as a stock price look-up application or database component, may be referenced in or associated with a dynamic content file 124 that is processed by a handler 120. The non-user-interface server component 130 may process events raised by the server-side control objects declared in the dynamic content file 124. As a result, the processing provided by the server-side control objects simplifies the programming of the non-user-interface server component 130 by encapsulating the processing and generation of the user interface elements of a web page, which allows the developer of the non-user-interface server component 130 to concentrate on the specific functionality of the application, rather than on user interface issues.

Figure 2:
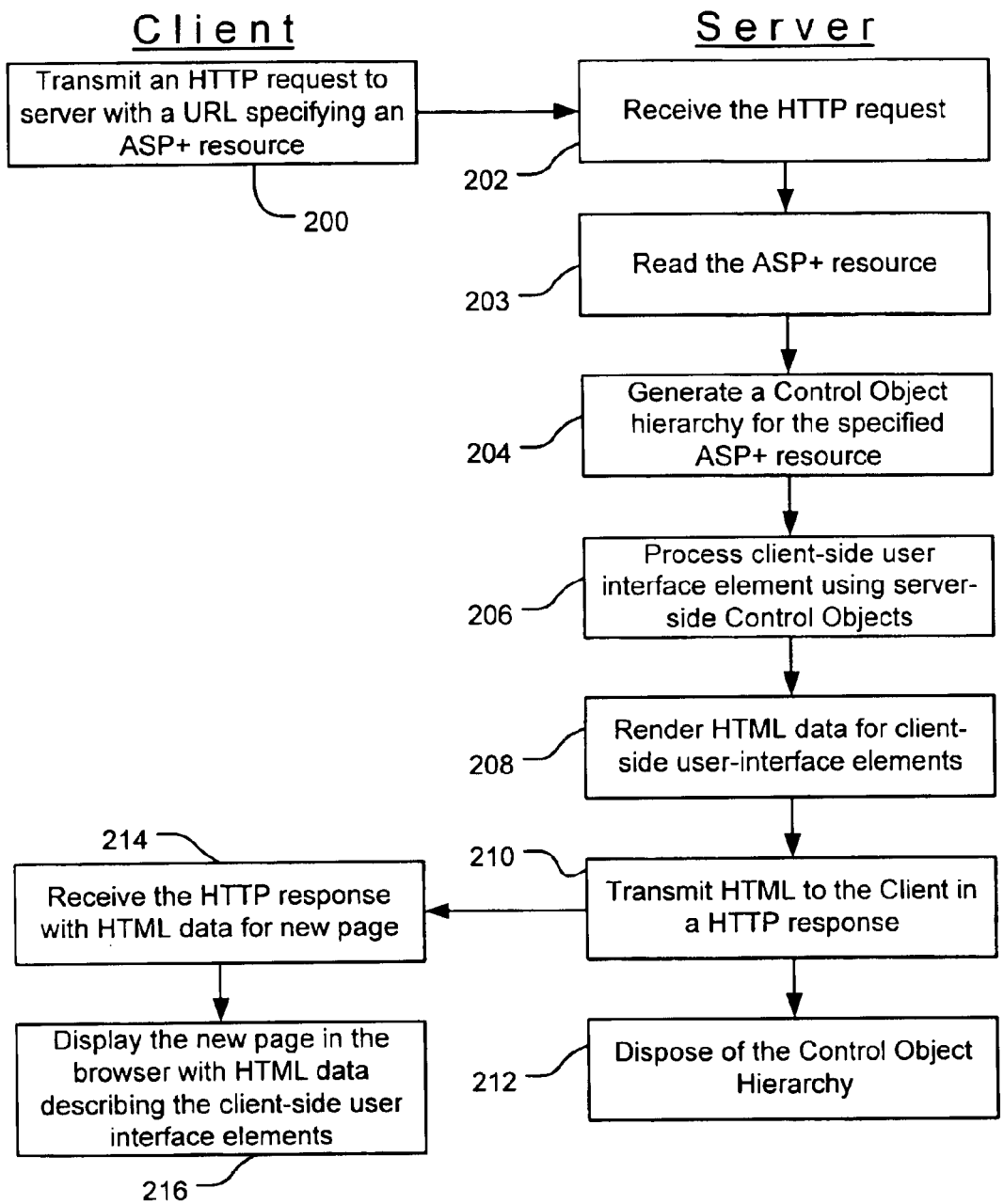
FIG. 2 illustrates a flow diagram of operations for processing and rendering client-side user interface elements using server-side control objects in an embodiment of the present invention.

FIG. 2 illustrates a flow diagram of operations for processing and generating client-side user interface elements using server-side control objects in an embodiment of the present invention. In operation 200, the client transmits an HTTP request to the server. The HTTP request includes a URL that specifies a resource, such as an ASP+ page. In operation 202, the server receives the HTTP request and invokes the appropriate handler for processing the specified resource. The ASP+ page is read in operation 203. Operation 204 generates a server-side control object hierarchy based on the contents of the specified dynamic content file (e.g., the ASP+ page).

In operation 206, the server-side control objects of the control object hierarchy perform one or more of the following operations: Postback event handling, postback data handling, state management, and data binding. In operation 208, each server-side control object in the hierarchy is called to generate (or render) data, such as HTML code, for display of client-side user interface elements in the web page. Note that, although the term "render" may be used to describe the operation of displaying graphics on a user-interface, the term "render" is also used herein to describe the operation of generating authoring language data that can be interpreted by client-application, such as browser, for display and client-side functionality. A more detailed discussion of the processing operation 206 and the rendering operation 208 is provided in association with FIG. 6. Calls to render methods in individual control objects are performed using a tree traversal sequence. That is, a call to the render method of a page object results in recursive traversal throughout appropriate server-side control objects in the hierarchy.

Alternatively, the actual creation of the individual server-side control objects may be deferred until the server-side control object is accessed (such as when handling postback input, loading a state, rendering HTML code from the control object, etc.) in operations 206 or 208. If a server-side control object is never accessed for a given request, deferred control object creation optimizes server processing by eliminating an unnecessary object creation operation. More details on deferred control object creation and postback input handling can be found in U.S. patent application No. 09/574,165, entitled POSTBACK INPUT HANDLING BY SERVER-SIDE CONTROL OBJECTS, incorporated herein by reference for all that it discloses and teaches, filed concurrently herewith, and assigned to the Assignee of the present application.

Operation 210 transmits the HTML code to the client in an HTTP response. In operation 214, the client receives the HTML code associated with a new web page to be displayed. In operation 216, the client system displays the user interface elements of the new page in accordance with the HTML code received from the HTTP response. In operation 212, the server-side control object hierarchy is terminated. Server-side control objects in the hierarchy are created in response to an HTTP request referencing an associated ASP+ page, and destroyed subsequent to the rendering of authoring language data (e.g., HTML data). Alternatively, operation 212 may alternatively be performed after operation 208 and before operation 210.

Figure 3:
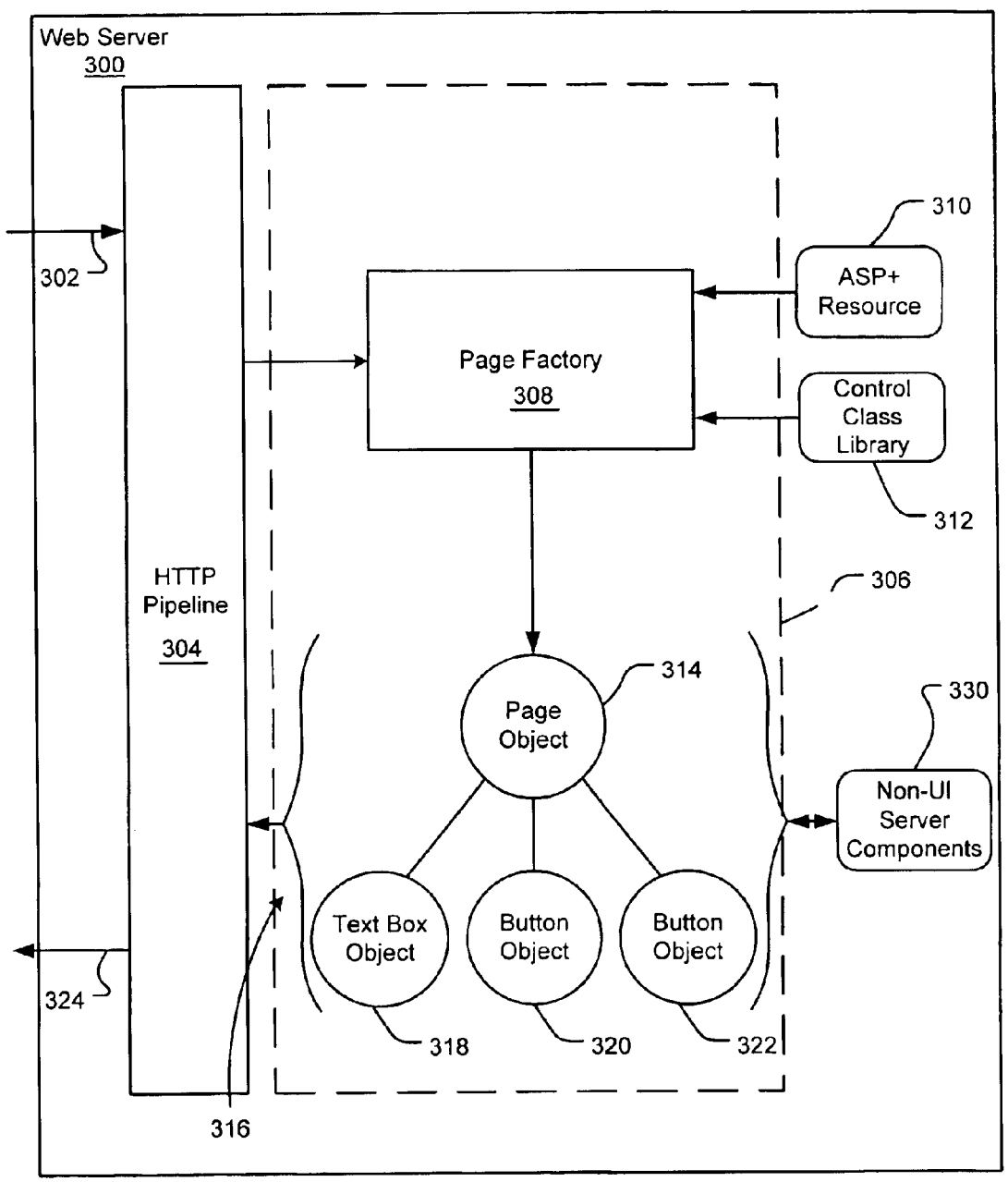
FIG. 3 illustrates exemplary modules in a web server used in an embodiment of the present invention.

FIG. 3 illustrates exemplary modules in a web server used in an embodiment of the present invention. The web server 300 receives an HTTP request 302 into the HTTP pipeline 304. The HTTP pipeline 304 may include various modules, such as modules for logging of web page statistics, user authentication, user authorization, and output caching of web pages. Each incoming HTTP request 302 received by the web server 300 is ultimately processed by a specific instance of an Interface Handler; e.g., IHTTPHandler class (shown as handler 306). The handler 306 resolves the URL request and invokes an appropriate handler factory (e.g., a page factory module 308).

In FIG. 3, a page factory module 308 associated with the ASP+ page 310 is invoked to handle the instantiation and configuration of objects from the ASP+ page 310. The ASP+ page 310 is identified or referenced by a unique URL and may be further identified by ".aspx" suffix, although other suffixes may be used. When a request for a particular ".aspx" resource is first received by the page factory module 308, the page factory module 308 searches the file system for the appropriate resource or file (e.g., the .aspx page 310). The file may contain text (e.g., authoring language data) or another data format (e.g., byte-code data or encoded data) that may later be interpreted or accessed by the server to service the request. If the physical file exists, the page factory module 308 opens the file and reads the file into memory. Alternatively, if the requested file exists but has been previously loaded into memory, then the resource may not necessarily need to be loaded into memory, as discussed in more detail below. If the requested aspx file cannot be found, the page factory module 308 returns an appropriate "file not found"error message, e.g., by sending an HTTP "404" message back to the client.

Once the ASP+ page 310 is read into memory, the page factory module 308 processes the file content to build a data model of the page (e.g., lists of script blocks, directives, static text regions, hierarchical server-side control objects, server-side control properties, etc.). The data model is used to generate a source code file of a new object class, such as a COM+ (Component Object Model+) class, that extends the page base class, which is the code that defines the structure, properties, and functionality of a page object. In an embodiment of the invention, the source listing is then dynamically compiled into an intermediate language, and later Just-In-Time compiled into platform native instructions (e.g., X86, Alpha, etc.). An intermediate language may include general or custom-built language code, such as COM+ IL code, JAVA bytecodes, Modula 3 code, SmallTalk code, and Visual Basic code. In an alternative embodiment, the intermediate language operations may be omitted, so that the native instructions are generated directly from the source listing or the source file (e.g., the ASP+ page 310). A control class library 312 may be accessed by the page factory module 308 to obtain predefined server-side control classes used in the generation of the control object hierarchy.

The page factory module 308 creates a page object 314 from the compiled class, wherein the page object 314, which is a server-side control object that corresponds to the web page 104 shown in FIG. 1. The page object 314 and its children (i.e., a text box object 318, a button object 320, and another button object 322) comprise an exemplary control object hierarchy 316. Other exemplary control objects are also contemplated in accordance with the present invention, including without limitation objects corresponding to the HTML controls in Table 1 (discussed below), as well as custom control objects. The page object 314 logically corresponds to the web page 104 of FIG. 1. The text box object 318 corresponds to the text box 106 in FIG. 1. Likewise, the button object 320 corresponds to the add button 108 in FIG. 1, and the button object 322 corresponds to the delete button 110 in FIG. 1. The page object 314 is hierarchically related to other control objects on the server. In one embodiment, a page object is a container object that hierarchically contains its children objects. In an alternative embodiment, other forms of hierarchical relations may be employed, including a dependency relationship. In a more complex control object hierarchy with multiple levels of children, a child object can be a container object for other child objects.

In the illustrated embodiment, the control objects in the control object hierarchy 316 are created and executed on the server 300, and each server-side control object logically corresponds to a corresponding user-interface element on the client. The server-side control objects also cooperate to handle postback input from the HTTP request 302, to manage the states of server-side control objects, to perform data binding with server-side databases, and to generate authoring language data (e.g., HTML code) used to display a resulting web page at the client. The resulting authoring language data is generated (i.e., rendered) from the server-side control object hierarchy 316 and transmitted to the client in an HTTP response 324. For example, resulting HTML (or other authoring language) code may reference ACTIVEX-type controls or other HTML constructs that yield client-side user interface elements (e.g., control buttons, text boxes, etc.) when processed by a browser.

By virtue of declarations made in the ASP+ page 310, server-side control objects may access one or more non-user-interface server components 330 to provide interaction between the non-user-interface server component 330 and client-side user interface elements. For example, in response to postback input, server-side control objects can raise server-side events to the non-user-interface server components registered for those events. In this manner the non-user-interface server component 330 can interact with the user through user interface elements without programming the code required to display and process these elements. FIG. 4 illustrates contents of an exemplary dynamic content file in an embodiment of the present invention. In the illustrated embodiment, the file 400 contains plain-text declarations in an exemplary dynamic content file format (e.g., ASP+). Each declaration provides instructions to the page factory module 308 that reads the file 400, creates the class, invokes the appropriate server-side control objects which ultimately render HTML code or any other authoring language for transmission to the client in an HTTP response.

The first line of the file 400 includes a directive between delimiters "<%@" and "%>" in the format:

<% @ directive {attribute=value}%> where directive may include without limitation "page", "cache" or "import". Directives are used by the page factory module 308 when processing a dynamic content file to determine such characteristics as buffering semantics, session state requirements, error handling schemes, scripting languages, transaction semantics, and import directions. Directives may be located anywhere within a page file.

In the second line, <html> is a standard HTML starting tag, which is written to the source code file as a literal text such that no additional processing takes place on the information in order to render the resulting HTML code other than a straightforward "write" command. In HTML, the <html> indicates the beginning of the HTML file and is paired with the closing tag on line 21, </html>, which is also a literal.

A code declaration block is located at lines 3–10 of the file 400. Generally, code declaration blocks define page objects and control object member variables and methods that are executed on the server. In the format:

<script runat="server" [language="language"][src="externalfile"]>

</script> where the language and src parameters are optional. In an embodiment of the present invention, code declaration blocks are defined using <script> tags that contain a "runat" attribute having a value set to "server". Optionally, a "language" attribute may be used to specify the syntax of the inner code. The default language may represent the language configuration of the overall page; however, the "language" attribute in the code declaration block allows a developer to use different languages within the same web page implementation including, for example, Jscript and PERL (Practical Extraction and Report Language). The "<script>" tag may also optionally specify a "src" file, which is an external file from which code is inserted into the dynamic content file for processing by the page compiler. It should be understood that the disclosed syntax is used in one embodiment, however, alternative embodiments may employ different syntaxes within the scope of the present invention.

In FIG. 4, two subroutines are declared in Visual Basic format within the code declaration block: AddButton_Click and DeleteButton_Click. Both subroutines take two input parameters, "Source" and "E", and are called when a client-side click event is detected on the corresponding button. In the AddButton_Click subroutine, the text in a UserName text box is concatenated on to the word "Add" and loaded into the Text data member of Message. In the DeleteButton_Click subroutine, the text in the UserName text box is concatenated on to the word "Delete" and loaded into the Text data member of Message. Although not shown in FIG. 4, member variables of server-side control objects may be declared in the code declaration block of the file 400. For example, using a Visual Basic syntax, the key word "DIM" declares a data variable of a server-side control object.

A "code render block" (not shown) can also be included in a dynamic content file. Code render blocks can contain an arbitrary amount of code that executes at page render time. In an embodiment of the present invention, a code render block executes in a "rendering" method that executes at page render time. Other portions of code can be executed in that rendering method. A code render block satisfies the following format (although other formats are contemplated in alternative embodiments):

<% InlineCode %> where InlineCode includes self-contained code blocks or control flow blocks that execute on the server at page render time.

Inline expressions may also be used within an expression render block delimiters "<%=" and "%>" using the exemplary syntax:

<%=InlineExpression %> where the expression contained in an InlineExpression block is ultimately encompassed by a call to "Response.Write (InlineExpression)" in a page object, which writes the value resulting from InlineExpression into appropriate place holder in the declaration. For example, InlineExpressions may be included in file 400 as follows:

<font size="<%=x %>"> Hi <%=Name %>, you are <%=Age %>! </font> which outputs a greeting and a statement about a person's age in a font stored in the value "x". The person's name and age are defined as strings in a code declaration block (not shown). The resulting HTML code is rendered at the server for transmission to the client in the HTTP response so as to include the values of the InlineExpressions at appropriate locations:

<font size="12"> Hi Bob, you are 35!

On line 11 of file 400, <body> is a standard HTML tag for defining the beginning of the body of the HTML document. On line 20 of file 400, the closing tag, </body>, is also shown. Both the <body> and </body> are literals in an embodiment of the present invention.

Within the body section of the HTML file 400, on line 12, the starting tag, <form>, of an HTML form block is found in FIG. 4. The ending tag, </form>, of the form block is found on line 19 of the HTML file 400. An optional parameter "id" may also be included in the HTML control tag, <form>, to associate a given identifier with the form block, thereby allowing multiple form blocks to be included in a single HTML file.

On line 18 of file 400, a server-side label, identified by "Message", is declared. The "Message" label is used in the code declared at lines 5 and 8 of the file 400 to display a label on the web page.

Within a form block, three exemplary HTML control tags are shown, corresponding to the user interface elements 106, 108, and 110 of FIG. 1. The first user interface element is declared on line 13 of the file 400 corresponding to a textbox. The text literal "User Name:" declares a label positioned to the left of the textbox. The input tag with type="Text" declares a textbox server-side control object having an id equaling "UserName" as a server-side control object that renders a textbox client-side user interface element. Lines 15 and 16 of file 400 declare the client-side user interface elements shown as buttons 108 and 110 of FIG. 1, respectively. Note that the "OnClick" parameter specifies the appropriate sub-routine declared in the code declaration block of the file 400. As such, the server-side button control objects generated in response to the declarations in file 400 render the HTML code for the client-side buttons and an associated script for implementing the button click events.

The textbox and buttons declared in file 400 are examples of HTML server control declarations. By default, all HTML tags within an ASP+ page are treated as literal text content and are programmatically inaccessible to page developers. However, page developers can indicate that an HTML tag should be parsed and treated as an accessible server control declaration by marking it with a "runat" attribute with a value set to "server". Each server-side control object may optionally be associated with a unique "id" attribute to enable programmatic referencing of the corresponding control object. Property arguments and event bindings on server-side control objects can also be specified using declarative name/value attribute pairs on the tag element (e.g., the OnClick equals "MyButton_Click" pair).

In an embodiment of the present invention, a general syntax for declaring HTML control objects is as follows:

<HTMLTag id="Optional Name" runat=server>
</HTMLTag> where the OptionalName is a unique identifier for the server-side control object. A list of HTML tags and the associated syntax and COM+ class that may be supported are illustrated in TABLE 1, although other HTML tags are contemplated within the scope of the present invention.

TABLE 1

| HTML Tag Name | Example | COM+ Class |
| --- | --- | --- |
| <a> | <a id = "MyAnchor" runat = server> My Link </a> | AnchorButton |
| <img> | <img id = "MyImage" runat = server> | Image |
| <span> | <span id = "MyLabel" runat = server> </span> | Label |
| <div> | <div id = "MyDiv" runat = server>Some contents</div> | Panel |
| <form> | <form id = "MyForm" runat = server> </form> | FormControl |

TABLE 1-continued

| HTML Tag Name | Example | COM+ Class |
|---|---|---|
| <select> | <select id = "MyList" runat = server><br>  <option>One</option><br>  <option>Two</option><br>  <option>Three</option><br></select> | DropDownList |
| <input type = file> | <input id = "MyFile" type = file runat = server> | FileInput |
| <input type = text> | <input id = "MyTextBox" type = text> | TextBox |
| <input type = password> | <input id = "MyPassword" type = password> | TextBox |
| <input type = reset> | <input id = "MyReset" type = reset> | Button |
| <input type = radio> | <input id = "MyRadioButton" type = radio runat = server> | RadioButton |
| <input type = checkbox> | <input id = "MyCheck" type = checkbox runat = server> | CheckBox |
| <input type = hidden> | <input id = "MyHidden" type = hidden runat = server> | HiddenField |
| <input type = image> | <input type = image src = "foo.jpg" runat = server> | ImageButton |
| <input type = submit> | <input type = submit runat = server> | Button |
| <input type = button> | <input type = button runat = server> | Button |
| <button> | <button id = MyButton runat = server> | Button |
| <textarea> | <textarea id = "MyText" runat = server><br>  This is some sample text<br></textarea> | TextArea |

In addition to standard HTML control tags, an embodiment of the present invention enables developers to create re-usable components that encapsulate common programmatic functionality outside of the standard HTML tag set. These custom server-side control objects are specified using declarative tags within a page file. Custom server-side control object declarations include a "runat" attribute with a value set to "server". Optionally, the unique "id" attribute may be specified to enable programmatic referencing of the custom control object. In addition, declarative name/value attribute pairs on a tag element specify property arguments and event bindings on a server-side control object. In-line template parameters may also be bound to a server-side control object by providing an appropriate "template" prefix child-element to the parent server control object. A format for a custom server-side control object declaration is:

<servercntrlclassname id="OptionalName"
      [propertyname="propval"] runat=server/> where servercnlrlclassname is a name of an accessible server control class, OptionalName is a unique identifier of the server-side control object, and propval represents an optional property value in the control object.

Using an alternative declaration syntax, XML tag prefixes may be used to provide a more concise notation for specifying server-side control objects within a page, using the following format:

<tagprefix:classname id="OptionalName" runat=server/> where tagprefix is associated with a given control narne-space library and classname represents a name of a control in the associated name-space library. An optional property-value is also supported.

Figure 5:
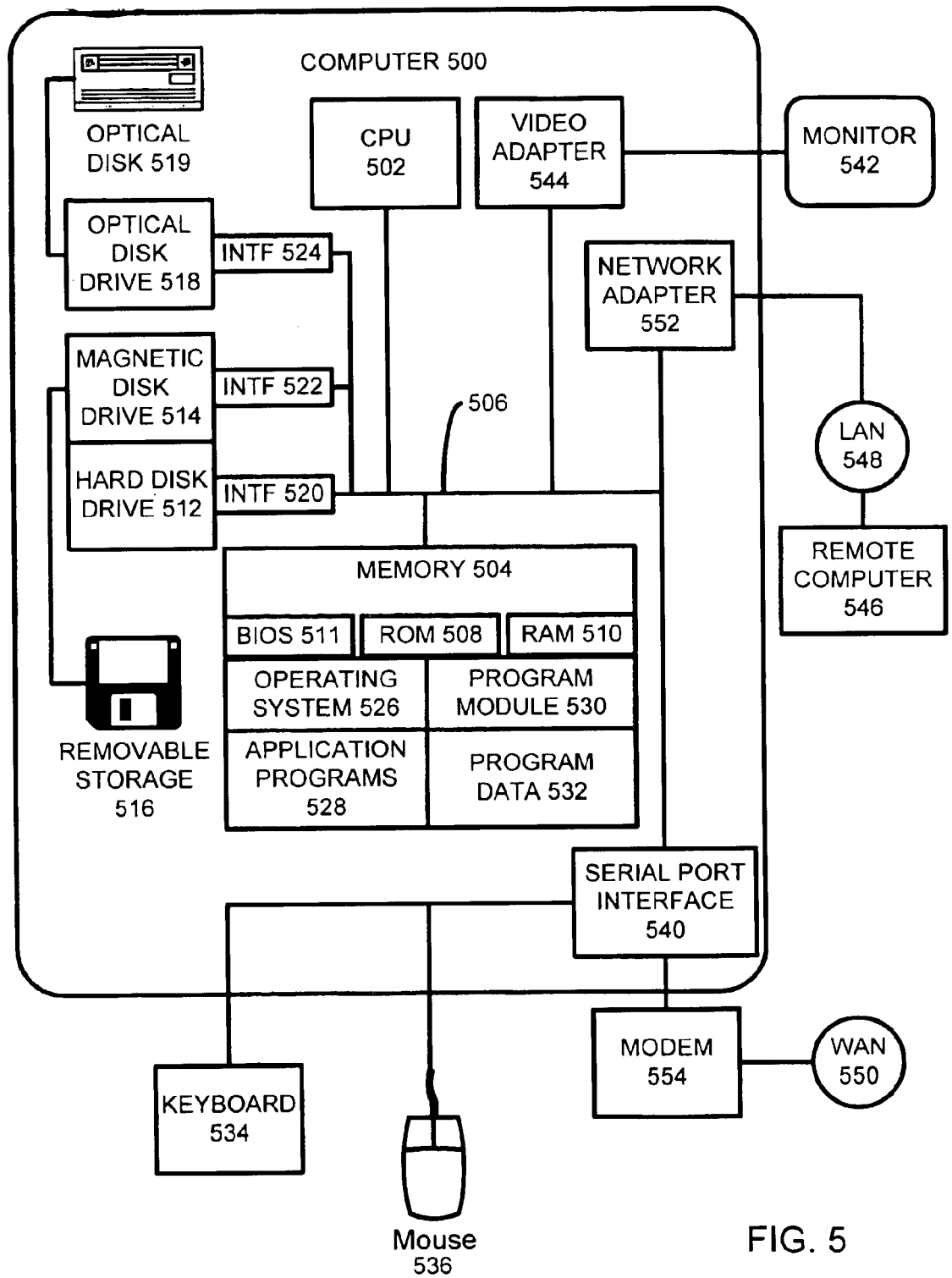
FIG. 5 illustrates an exemplary system useful for implementing an embodiment of the present invention.

With reference to FIG. 5, an exemplary computing system for embodiments of the invention includes a general purpose computing device in the form of a conventional computer system 500, including a processor unit 502, a system memory 504, and a system bus 506 that couples various system components including the system memory 504 to the processor unit 500. The system bus 506 may be any of several types of bus structures including a memory bus or memory controller, a peripheral bus and a local bus using any of a variety of bus architectures. The system memory includes read only memory (ROM) 508 and random access memory (RAM) 510. A basic input/output system 511 (BIOS), which contains basic routines that help transfer information between elements within the computer system 500, is stored in ROM 508.

The computer system 500 further includes a hard disk drive 512 for reading from and writing to a hard disk, a magnetic disk drive 514 for reading from or writing to a removable magnetic disk 516, and an optical disk drive 518 for reading from or writing to a removable optical disk 519 such as a CD ROM, DVD, or other optical media. The hard disk drive 512, magnetic disk drive 514, and optical disk drive 518 are connected to the system bus 506 by a hard disk drive interface 520, a magnetic disk drive interface 522, and an optical drive interface 524, respectively. The drives and their associated computer-readable media provide nonvolatile storage of computer readable instructions, data structures, programs, and other data for the computer system 500.

Although the exemplary environment described herein employs a hard disk, a removable magnetic disk 516, and a removable optical disk 519, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 516, optical disk 519, ROM 508 or RAM 510, including an operating system 526, one or more application programs 528, other program modules 530, and program data 532. A user may enter commands and information into the computer system 500 through input devices such as a keyboard 534 and mouse 536 or other pointing device. Examples of other input devices may include a microphone, joystick, game pad, satellite dish, and scanner. These and other input devices are often connected to the processing unit 502 through a serial port interface 540 that is coupled to the system bus 506. Nevertheless, these input devices also may be connected by other interfaces, such as a parallel port, game port, or a universal serial bus (USB).

A monitor 542 or other type of display device is also connected to the system bus 506 via an interface, such as a video adapter 544. In addition to the monitor 542, computer systems typically include other peripheral output devices (not shown), such as speakers and printers.

The computer system 500 may operate in a networked environment using logical connections to one or more remote computers, such as a remote computer 546. The remote computer 546 may be a computer system, a server, a router, a network PC, a peer device or other common network node, and typically includes many or all of the elements described above relative to the computer system 500. The network connections include a local area network (LAN) 548 and a wide area network (WAN) 550. Such networking environments are commonplace in offices, enterprise-wide computer networks, intranets, and the Internet.

When used in a LAN networking environment, the computer system 500 is connected to the local network 548 through a network interface or adapter 552. When used in a WAN networking environment, the computer system 500 typically includes a modem 554 or other means for establishing communications over the wide area network 550, such as the Internet. The modem 554, which may be internal or external, is connected to the system bus 506 via the serial port interface 540. In a networked environment, program modules depicted relative to the computer system 500, or portions thereof, may be stored in the remote memory storage device. It will be appreciated that the network connections shown are exemplary, and other means of establishing a communication link between the computers may be used.

In an embodiment of the present invention, the computer 500 represents a web server, wherein the CPU 502 executes a page factory module 308 on an ASP+ file stored on at least one of storage media 516, 512, 514, 518, 519, or memory 504. HTTP responses and requests are communicated over the LAN 548 which is coupled to a client computer 546.

Figure 6:
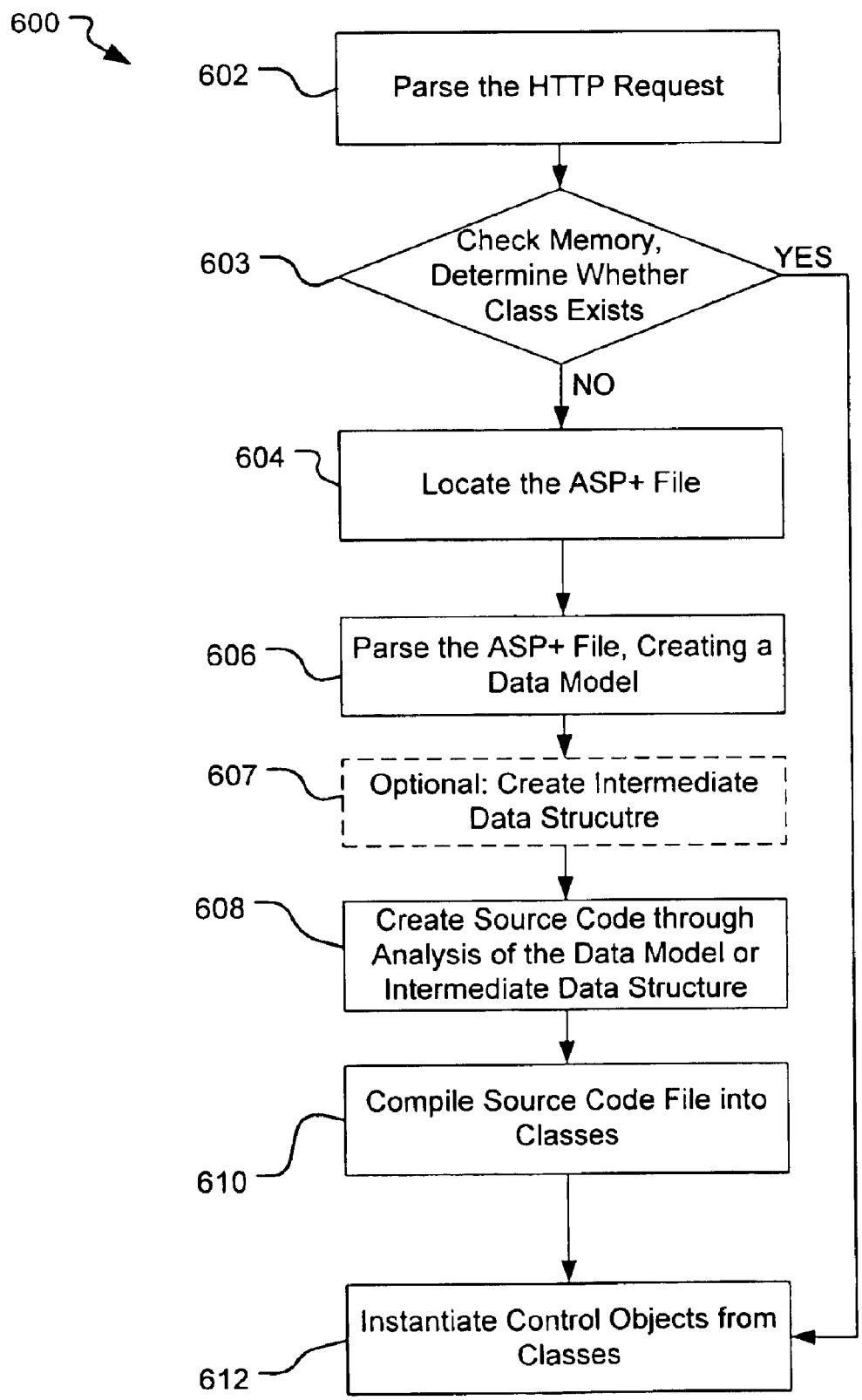
FIG. 6 illustrates a process flow diagram representing processing of a page object in an embodiment of the present invention.

The process 600 performed by the page factory module 308 is illustrated in the flow chart shown in FIG. 6 where process 600 generally corresponds to the process of Generating a Control Object Hierarchy 204 (FIG. 2). Process 600 converts an ASP+ page (also referred to as an ASP+ file) into a compiled, object-code class which is then loaded into memory to instantiate the control objects 314, 318, 320 and 322 (FIG. 3).

The page creation process 600 begins after the server receives a request for a URL at operation 202 (FIG. 2). Following the receipt of the request, parse operation 602 parses the requested URL to determine which resource is requested. Resources may include static files (.htm, .gif, .jpg, etc.), directory browsing activation, DAV (digital audio/video) files as well as dynamic content requests (.aspx, .soap, etc), which the present invention is designed to handle. Incoming HTTP requests received by the server are ultimately processed by a specific instance of a handler class, e.g., an IHTTPHandler class. Through the use of the handler factories, e.g., IHTTPHandler "factories," a pluggable architecture is provided that resolves the actual resolution of URL requests to handler instances, e.g., IHTTPHandler instances. This resolution is facilitated using application configuration settings that can map an incoming URL's file-extension and an HTTP command to a factory class, e.g., an IHTTPHandlerFactory class ultimately responsible for creating an appropriate handler instance, e.g., an IHTTPHandler instance. Although the parse operation can identify a variety of resources through the pluggable architecture, the remainder of the discussion will focus on an HTTP request that identifies a dynamic web page content resource, and more particularly on a dynamic web page content file, such as an .aspx or ASP+ page or file.

Once the actual resource is identified at parse operation 602, check operation 603 checks the memory to determine if the class exists in memory. In order to determine whether the class has been compiled either check operation 603 searches for the class in memory by name by searching for a flag that was set when the class was compiled. Either way check operation 603 searches for an indicator that the compiled class has already been compiled and stored. If the class is in memory, flow branches YES to instantiate operation 612. Instantiate operation instantiates control objects from the compiled class. If check operation 603 determines that the class is not being compiled, then flow branches NO to locate operation 604.

If check operation 603 determines that the class does not exist in memory, locate operation 604 searches for and locates the specific resource and reads the file into memory. A base class, such as "System.ASP.WebForms.PageFactory" class, provides a handler factory implementation that handles the instantiation and configuration of ASP and ASPX pages. If the resource, in this case a physical dynamic web page content file, is not found, an appropriate error message is returned.

Following the locate operation 604, the process 600 continues with parse create operation 606, which parses the resource, such as an ASP+ file. The parse/create operation 606, reads the ASP+ file, declaration by declaration, and creates a data model from information gleaned while parsing. A data model is data structure, containing elements that are related to the elements of the active content file from which source code can be derived. The data model contains structural elements that were referenced in the active content file and these elements are connected so as to represent the structure of the resulting control objects of the active server page. In an embodiment of the invention, the data model is a combination of objects that are linked in a hierarchical tree structure.

Each declaration of the web content file has certain elements that indicate how to create the data model as well as information to be stored in the data model. For example, if the declaration is a literal text declaration then the data model only needs to contain the information in such a manner that the text will be inserted in the proper location. However, if the declaration indicates that there is a nested control object, then the data model must be created that follows the nesting as declared in the ASP+ file. In essence, the data model will contain an object for each of the declarations, and each object will contain information related to whether child objects exist for each object.

Once the ASP+ file has been parsed and the data model has been created, an optional create operation 607 may be performed. Create operation 607 analyzes the data model and creates an intermediate data structure which is an abstraction of the source code, e.g., the source code file that is to be created, as discussed below. In essence the intermediate data structure is a generic data structure that describes code. The intermediate data structure has an upper level data structure that describes the classes. For each class there may be another level data structure that has the class name and a list or array of the methods. Further, each method is itself a data structure having various elements such as statements and declarations. The statement may then include items such as expressions data calls, etc.

Once the ASP+ file has been parsed and the data model (and optionally, the intermediate data structure) has been created, create source code module 608 creates the necessary source code through an analysis of the data model, typically writing various lines of code for each declaration found in the ASP+ file. In general, this step involves the straightforward translation of known declarations and other information in the data model into code. Such translations are either hard coded into the application that performs the translation or each translation may be stored in a lookup table. Lookup tables of this sort can be created to supply the proper translation for almost any language, yet the use of object oriented source code languages simplifies the compilation into COM or COM+ classes to take advantage of existing COM or COM+ libraries. (Exemplary source code languages include C++ or VBasic.) Moreover, if an intermediate data structure is created at operation 607, then the translation becomes even more straightforward. In such a case, the data structure is significantly closer to being a generic source code language file such that the translation may be merely the addition of proper lexicon and syntax to create a source code file for a particular source code language.

The ASP+ file declares a particular source code language for the resulting source code file. If no language has been declared in the ASP+ file, then a default language, such as Visual Basic, may be used. The resulting source code file, generated from the data model or from the intermediate data structure, is essentially the type of sophisticated source code file a programmer would have to write if that programmer was to take advantage of the server-side control object hierarchy and did not have the benefit of this code generation tool.

Upon completion of the source code file, compile operation 610 compiles the source code file, creating a compiled class in object code or other executable form. Alternatively, the class could be compiled into byte codes or other language that can run on a virtual machine. Compiling the source code file involves the use of a compiler designed to compile the source code language found in the source code file. The class may then be called by instantiate operation 612 to create the page object and resulting control objects for the web page. The instantiate operation, if not explicitly provided in the URL request is an implicit operation as part of the URL request for a particular resource.

Once the ASP+ file has been compiled into a page class, the class remains available for future requests. Therefore, the process of generating source code for the ASP+ file only needs to happen once and later requests can take advantage of the compiled class, instantiating necessary objects as required. The compiled class may be cached for a short period of time and/or the compiled class may be stored to disk. Indeed, once the ASP+ file has been compiled, it is not necessary to touch the original ASP+ file again. Of course if the ASP+ file is modified, then the compilation process is repeated to update the page class. An appropriate flag or other indicating mechanism can be used to determine whether the ASP+ file has been updated, therefore enabling automatic class updates. Alternatively, the responsibility of removing the cached class upon updating the ASP+ up to the web page file can be left to the developer.

Figure 7:
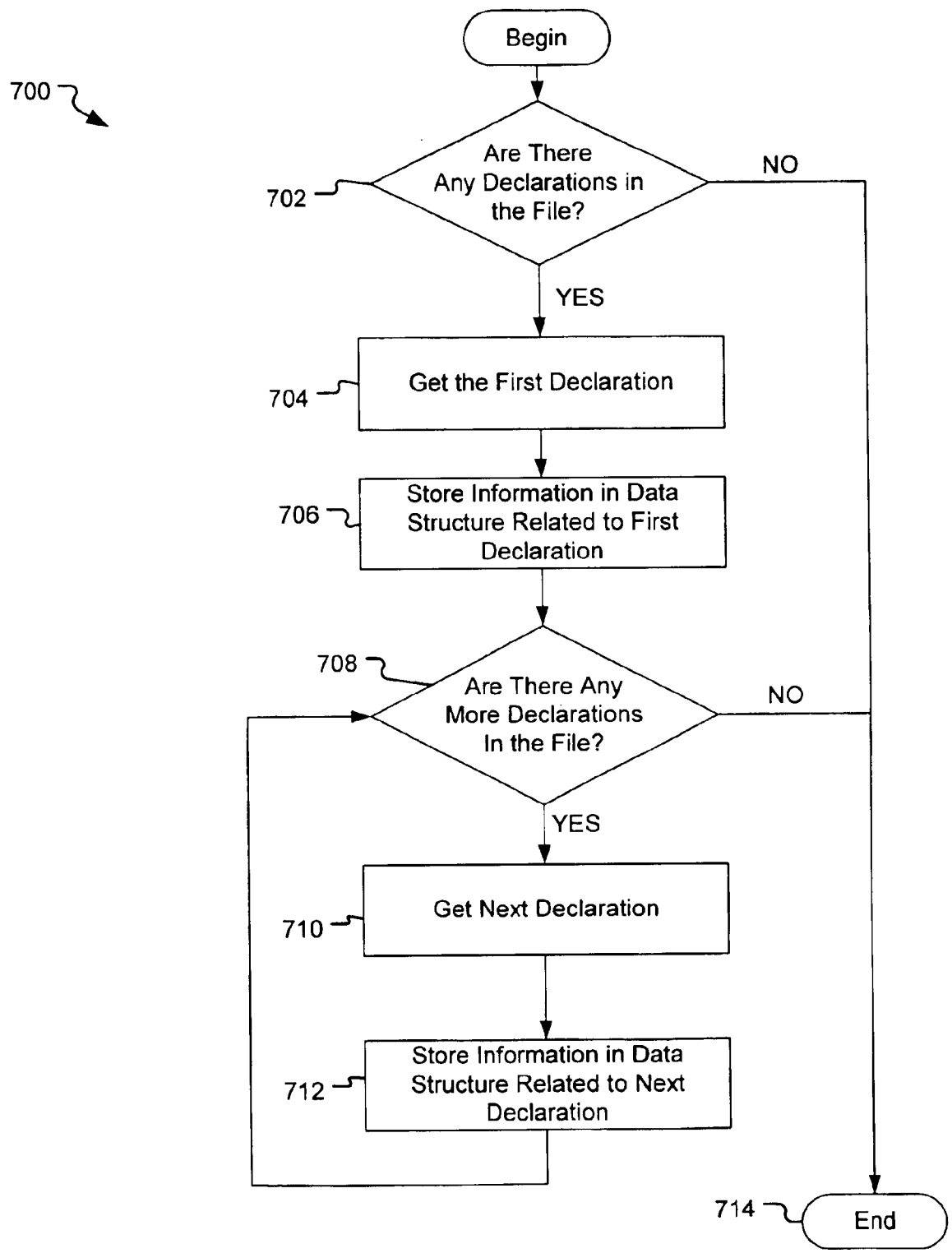
FIG. 7 illustrates a process flow diagram representing the parsing of a seven-side application to create a data model.

Details associated with the creation of the data model are shown in FIG. 7. The data model creation process 700 begins as test operation 702 determines whether there are any declarations in the ASP+ file. If there are no declarations to be compiled, such as in a pure HTML file, flow branches NO to the end of the process 714.

If there is at least one declaration in the ASP+ file, as determined at test operation 702, flow branches YES to get operation 704, which gets the first declaration in the ASP+ file. The information from the first declaration is then stored in a data structure by store operation 706. Not only is the actual declaration stored in the data structure, but also information related to the first declaration can be stored in the data structure such as whether the declaration declares a container type control having children or whether the declaration declares directives, etc. Since the web page is an ASP+ file, it typically has, as a first declaration, a directives tag. The directives tag includes various directives, e.g., information between the delimiters "<%@" and the "%>" as shown in line 1 in FIG. 4. It should be understood that the delimiters shown in FIG. 4 are merely exemplary and other choices are possible. The directives supply information to the page factory module that is used in creating the source code file. For example, the directives shown in FIG. 4 at line 1 indicate, for example, that the default language that should be used is VB (i.e., Visual Basic), among other things.

Once the first declaration has been retrieved and stored in a data structure, the process 700 continues with test operation 708 which determines whether there is another declaration in the file. This operation is similar to operation 702 described above. If there are no more declarations, flow branches NO to end step 714. If there is another declaration, flow branches YES to get operation 710, which gets the next declaration.

Following the retrieval of the next declaration, store operation 708 stores information related to the next declaration in a different data structure which is linked to the other data structures of the data model. As discussed above with respect to the first declaration, the information stored in the data structure may include not only the literal text of the next declaration but also information derived from the literal text. As such, the data structure can be linked to the first data structure in a hierarchical manner if necessary.

Following the storing of the information in the next data structure, flow branches back to test operation 708 which determines whether the resource file, e.g., the ASP+ file, has any more declarations to read into the data model. If not, flow branches NO to the end of the process.

However, if test operation 708 determines that there are more declarations, then flow branches YES to get operation 710 which gets the next declaration. Following get operation 710, store operation 708 stores information related to next declaration as described above. These steps 708, 710, and 712 continue until all declarations are retrieved in a sequential manner and stored in data structures. The data structures may be linked together in a hierarchical manner wherein nested objects, children, nodes or sub-elements of parent objects, are connected so that they are identifiable as sub-elements.

Create source code module 608 (FIG. 6) uses this data model to create the source code file of a particular source code language. It is important to note that the process of creating the source code file from the data model depends on the source code language. That is, a source code file written in a particular language typically has some specific format requirements, e.g., that all variable declarations precede the use of those variables. As such, since the compiler for that language is called, the proper program instructions must be placed in their proper locations within the source code file. In order to accomplish this task, the ASP+ file must be evaluated to determine what unique elements or features are in the file and the file must then be processed to produce the source code file. Since the source code file typically requires that a first set of elements or declarations must be at the beginning of the file, such as variable declarations, the entire data model should be analyzed for this information. Similarly since object information should be in the middle of the file, the entire data model should be analyzed for this information, during a second phase of the process, following the first phase of the process.

These phases are the functional process of determining the separate portions of code that should be written to the source code file (or intermediate data structure at operation 607), wherein the separate portions are logically combined based on resulting location within the source code file. As such, the phases may be considered "passes" or traversals of the singular data model and thus occur consecutively. Alternatively however, the phases may occur as separate parallel processes, the results of the separate processes being merged into one source code file wherein the processes evaluate either the singular data model or separate copies of the data model. In yet another alternative, the functional processes or phases of determining and writing the separate portions of code may be performed during a single traversal, where the source code is selectively written to separate portions of the source code file or where the portions are written to separate files that are merged or linked to provide the proper connection between logical portions of source code. Therefore, although the separate analyses are described herein as being performed in a substantially consecutive manner, i.e., one after another, the analyses may be split and performed in a substantially simultaneous manner.

Figure 8:
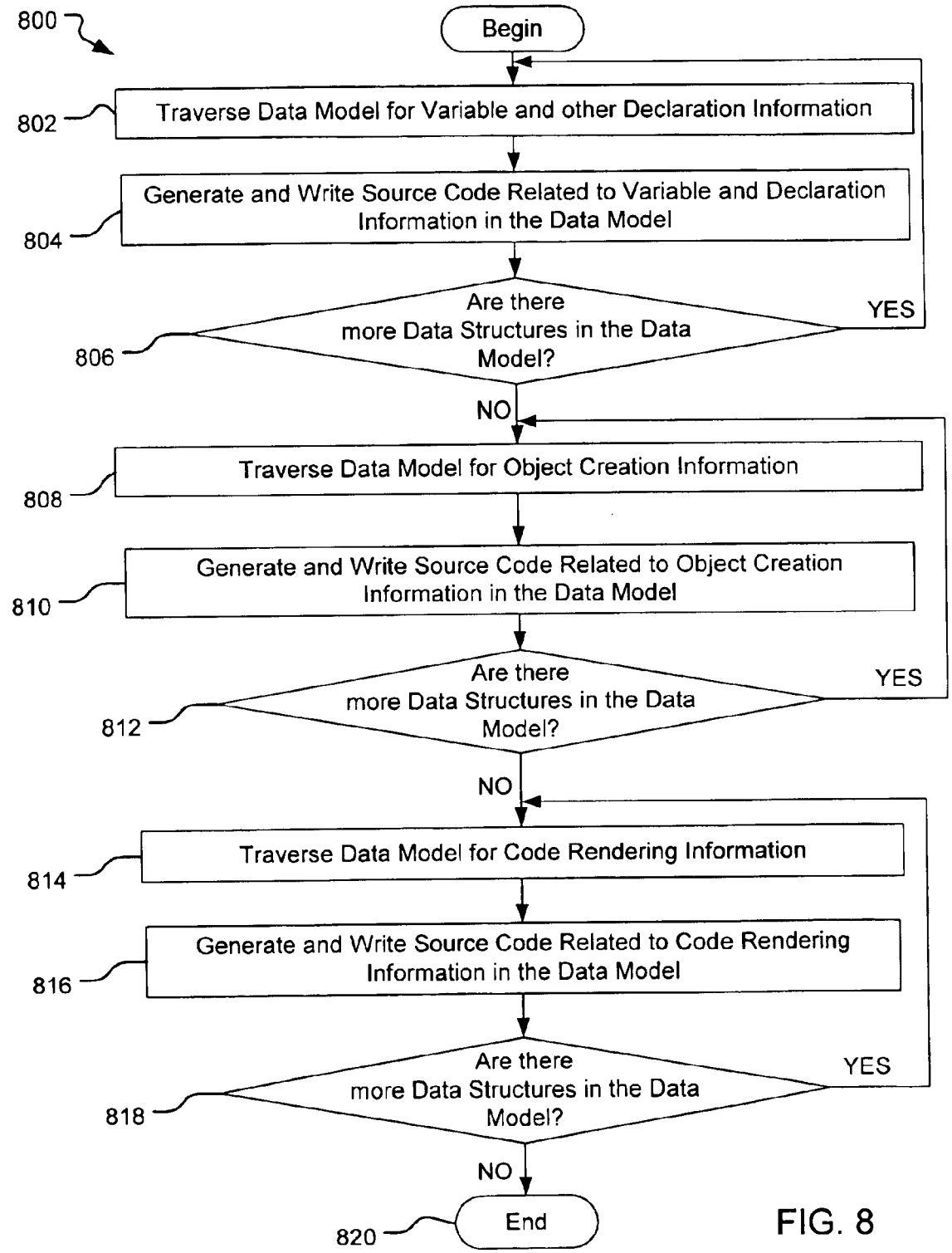
FIG. 8 illustrates a process flow diagram representing the traversal of the data model to create a source code file.

The operation or flow shown in FIG. 8 relates to an embodiment that generates source a code file relatively directly from the data model, i.e., omitting operation 607 shown in FIG. 6. The embodiment generates a source code file, such as a VB code file, where the variables must be declared in the beginning and the objects and methods follow the variable information. The create source code process 800 shown in FIG. 8 illustrates the separate phases as "passes" of the data model and as such, makes three passes through the data structures of the data model. In the first pass, the process is looking for variable and declaration information. In the second pass, the process is looking for object creation information, and in the third pass process 800 is looking for code rendering information.

The first pass begins as traversal operation 802 traverses the data model for variable and other declaration information. This step begins by analyzing the first data structure of the data model created by process 700. During the analysis of the first data structure, the process determines whether any specific lines of source code should be written to the source code file related to declarations.

Once the analysis of the first data structure has been completed, operation 804 generates and writes source code related to the variable and declaration information to the source code file. A writer object may be called to simply write the text given to it to the source code file. Thus, a call to the writer object includes both a parameter of the source code file name and a text string of the syntax for the particular programming language related to the variable or declaration information. Alternatively, the text may be copied or otherwise written into the source code file using other known methods.

Operation 804 also must determine the proper syntax to deliver to the writer object. In essence, if the current data structure represents a server side control, operation 804 generates source code for it. Otherwise 804 copies it to the source code file. In essence, Operation 804 may do one of three things. First, generate operation 804 may determine that the information in the ASP+ file is literal text and as such, should be written directly to the source code file. This may be the case where an HTML tag is inserted in the ASP+ file and in this case, no source code declaration is generated, instead the information is simply copied to the source file. Second, the operation 804 may determine that the text requires a simple translation, a one to one association with a proper syntax form for the specific source code language. Operation 804, in such a case, will either look up the one-to-one translation or, if hard-coded in the page factory module, the one-to-one translation is performed and the resulting information is supplied to the writer object. Third, if a one-to-one translation is not available, the operation 804 may determine that a more complex translation is required and as such may call a module or subsequent look-up table operation to perform the operation of creating the proper source code syntax to be conducted to the writer object. Typically, for declaration information the translation is straightforward.

Once operation 804 generates and writes source code for the first data structure, test operation 806 detects whether there are any more data structures in the data model to be analyzed. If there are more data structures to be analyzed during this first pass of the data model, flow branches YES to the beginning of process 800 in that the transversal is made at 802 to the next data structure. In such a case, the next data structure will be analyzed as discussed above to generate source code syntax and to call the writer object for writing that syntax code into the source code file.

If test operation 806 determines that there are no more data structures in the data model to be analyzed during this first pass, flow branches NO to traverse operation 808, and the second pass through data structures begins. Traverse operation 808 begins the next phase of writing codes typically to write the object building and methods creation. Traverse operation 808 begins at the top of the data model and returns the data structure at the beginning of the data model.

Next, generate and write source code operation 810 analyzes the first data structure to determine if information related to object creation is located in that first data structure. If such object creation information exists in that first data structure then syntax for the specific programming language is created, generated and sent to a writer object to write to the source code file. In essence, operation 810 is similar to operation 804 discussed above wherein the data structure is analyzed for a specific type of information and once that information is gleaned from the data structure, the operation performs some sort of translation to create source code language related to that information. If the information is literal, then operation 810 can transfer that information directly into the source code file. Similarly if that information requires a simple translation then that simple translation may be hard coded into the program or may be part of a look up table type operation. Additionally, if a more complex structure is required then a look up table or other module can be called to process the information and to create the proper syntax source code for the source code file.

Following operation 810, query step 812 tests whether there are any more data structure in the data model to be analyzed. If there are more data structures in the data model to be analyzed for object creation, then flow branches is YES to traverse operation 808 which traverses to the next data structure. Thus, operation 808 returns the next data structure and operation 810 analyzes that data structure for information related to object creation. This object creation information, as discussed above translates into source code lines that can be sent to the writer object and appended to the source code file. Steps 812, 808 and 810 repeat until all source code has been written with respect to object creation.

If determination step 812 determines that there are no more data structures in the data model to be analyzed for object creation then flow branches NO to operation 814, and the second pass is completed. The third pass begins with operation 814 at the top of the data model. As discussed above with respect to operations 808 and 802 this traversal step initially retrieves the first data structure in the data model. Following the retrieval of the first data structure in the data model at operation 814, operation 816 analyzes that data structure for code rendering information. Code rendering information translates into specific syntax in the programming language to be sent to the writer and appended to the source code file. Code rendering methods may be located towards the end of the source code file, and therefore a third pass is implemented following the object creation pass. Alternatively, the cod rendering methods may be generated during a simultaneous thread process and appended to the end of the source file.

Operation 816 is quite similar to operations 810 and 804 discussed above wherein this source code information can be gleaned from the code rendering information found in the data structure. Moreover, as discussed above, the information may be inserted directly, it may be translated one-to-one ratio, or it may be required that a more complex module is used to generate the syntax for the source code file. Following operation 816, detect operation 818 determines whether there are any more data structures in the data model.

If operation 818 detects that there are more data structures to be analyzed during this third pass, flow branches YES back to 814 for traversal to the next data structure. Once the next data structure has been called then operation 818 generates and writes source code relating to code rendering information in that next data structure.

If operation 818 determines that there are no more data structures to be analyzed then flow branches NO to the end of the process at operation connection 820.

As can be seen by the above description, several passes are made through the data model. This is due to the fact that each declaration in the data model may require specific lines of code that should be placed in various spots in the source code file. However, in writing the source code file the writer object can only write sequentially, continuously appending to the file and cannot insert lines of source code in between previously written lines of code. Therefore, the data model must be traversed more than once to glean the proper information that belongs in the first or upper portion of the source code, in the second or middle portion of the source code, and a third or last portion of the source code file. It is foreseen that the number of passes may vary depending on the number of portions of code that exist for the various computer languages.

Figure 9:
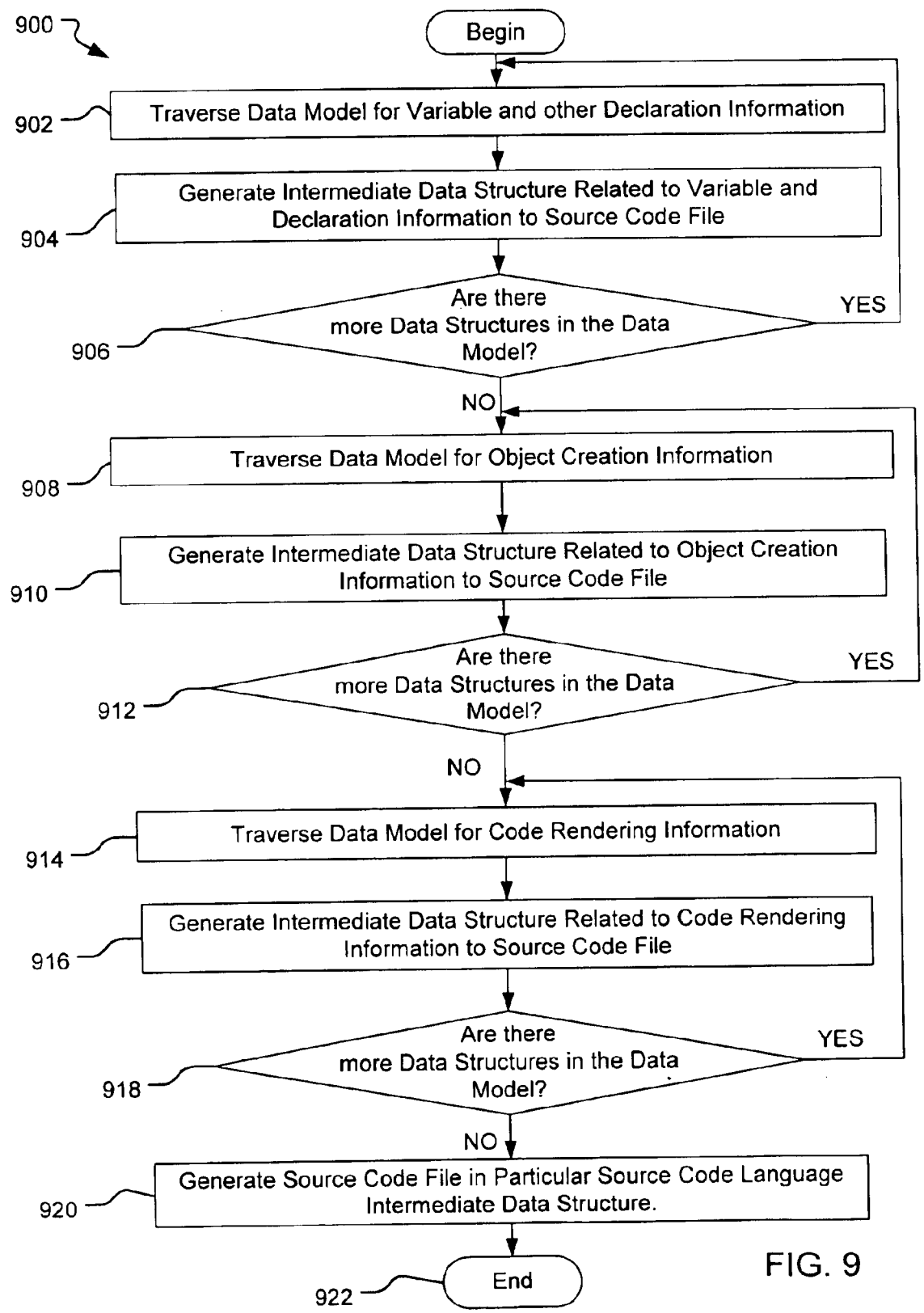
FIG. 9 illustrates a process flow diagram representing the traversal of the data model to create a source code file in an alternative embodiment of the present invention.

The operation or flow shown in FIG. 9 relates to an alternative embodiment that generates an intermediate data structure from the data model and then generates the source code file from the intermediate data structure, i.e., operations 607 and 608 shown in FIG. 6. The flow 900 of this embodiment is similar to the flow shown in FIG. 8 except that operations 804, 810 and 816 generate source code of a particular language and operations 904, 910 and 916 generate portions of the intermediate data structure, instead of generating source code. Thus, operations 904, 910 and 916 perform operations similar to operations 804, 810 and 816 in generating information related to information in the data model. However, the generated information is generic and may be used at a later time to create source code files of different source code languages.

The first pass begins as traversal operation 902 traverses the data model for variable and other declaration information. If test operation 906 determines that there are no more data structures in the data model to be analyzed during this first pass, flow branches NO to traverse operation 908, and the second pass through data structures begins. Following operation 910 query step 912 tests whether there are any more data structures in the data model be analyzed. If there are more data structures in the data model to be analyzed for object creation, then flow branches YES to traverse operation 908 which traverses to the next data structure. If determination step 912 determines that there are no more data structures in the data model to be analyzed for object creation then flow branches NO to operation 914, and the second pass is completed. The third pass begins with operation 914 at the top of the data model.

Following operation 916, detect operation 918 determines whether there are any more data structures in the data model. If operation 918 detects that there are more data structures to be analyzed during this third pass, flow branches YES back to 914 for traversal to the next data structure. Once operation 918 has determined that there are no more data structures in the data model to be analyzed then the intermediate data structure is complete and flow branches to create operation 920. Create operation creates a source code file from the intermediate data structure. Since the data structure is a generic description of the source code file, operation 920 translates the intermediate data structure from a generic description to a specific language code file. The flow 900 ends at end operation 922.

FIG. 10 is an example of a web page resource file, i.e., an ASP+ file authored by a web page developer, the file being the subject of the process 600 to generate a source code file. The ASP+ page shown in FIG. 10 has a directives line at line 1; a server side script block at lines 3 through 13; and a server side control declaration block at lines 16 through 21. The directives line is used by the process 600 to determine what type of source code language to use and to give it a general description but otherwise doesn't result in any code in the source code file. All code written within a code declaration block "<script runat=server> <script>" is conceptually treated as page member declarations (variables, properties, methods) and is directly inserted into the source file of the generated file as shown in FIG. 11.

FIG. 11 is an exemplary source code file that has been created by the process of creating a source code using the ASP+ file shown in FIG. 10. The first line of FIG. 11 shows that the page class that is going to be created by the source code file, when compiled, inherits from System.ASP.Web-Forms.Page. Inheriting from this class is an important step as it provides many of the control functions for page class. As a default, the generated source-file subclasses the "System.ASP.WebForms.Page" base class. Developers can optionally specify an alternative class using the "Inherits" attribute provided on the directive line.

Lines 3 and 4 show the variable declarations that were created during the first pass through the data model.

During the second pass the information shown in line 6 was created to create a new control object "DataList" and name it MyData. In an embodiment, all code written within in the ASP+ file declaration block "<script runat=server> </script>" is conceptually treated as page member declarations (variables, properties, methods) and is directly inserted into the source file of the generated file as discussed above. Thus, the lines of code 8–13 were directly inserted as literal text. During the creation of the data model 606, information related to literal text was stored in a string or an array, essentially above or apart from the data model, such that it was not traversed during the multiple passes (FIG. 8).

During the creation of the data model, it was determined that this information would be inserted directly, thus enabling its storage as an array having a reference pointer in the data model. During the generation of the code, this information is simply inserted into the source code file.

Lines 15 to 39 represent a section of code that was written during the second pass related to building control object information. Lines 15–20 represent code used in the creation of a top-level object. The top-level object is a container type object for the entire page, such as the page object 314 shown in FIG. 3. This control object is built relatively independently of the of the substantive code shown in FIG. 10, as all ASP+ pages created will have this type of control object.

Lines 22–27 of FIG. 11 represent code used in the creation of a child control object named MyList. As shown in line 16 of FIG. 10, a tablelist control was defined and given an id "MyList" The information from FIG. 10, line 16 translates at step 810 (FIG. 8) into the lines 22–27 shown in FIG. 11. In essence, when operation 810 parses the code portion on line 16 of FIG. 10, a recognition occurs that a control of type "tablelist" should be created. Once recognized, the basic information in lines 22–27 shown in FIG. 11 are either looked up from a table or generated using known calculations while inserting the proper variables such as "MyList" to generate the code shown in the lines 22–27. Since the system is designed to recognize this type of controls, the code shown in FIG. 11 can be generated. Once generated, operation 810 also writes the code to the file.

Similarly, lines 29–34 of FIG. 11 represent another control object, in this case an object of the type "template." Templates are special objects in that they are also container controls, and in that they actually generated at run time. In any event, the code required to generate the control object for the template is generated at step 810 (following the test 812 which determined that there were more data structures in the model.) As discussed above, a recognition occurs that a template control object should be generated and therefore the code shown in FIG. 11 is generated and written to the file. Importantly, the code for the template requires information related to its child controls, evidenced by the references to "control3" in lines 32 and 33 in FIG. 11. Therefore, when the data model was created at 606 (FIG. 6), this information or an indication to determine this information was stored with the template control information. Again, the code is predetermined for template control objects such that the generation of the code is straightforward.

A child control is created within the template using the code on line 19 of FIG. 10 and its corresponding translated code at lines 36–39 of FIG. 11. Line 19 of FIG. 10 calls for a control of type "label" having an id "MyLabel". As with the tablelist control and the template control, the label control is a known type of control that operation 810 recognizes and is able to then generate the proper code and write it to the file as shown in lines 36–39 of FIG. 11.

Lines 41 through 51 were created, generated and written to the source code file last during the last pass of the data model. The lines of code at lines 41–51 represent render methods which are called to render the HTML code that becomes part of the response to the client. The rendering code is generated based on a recognition, during step 816 that such code should be generated. Once recognized, the code is simply determined from a lookup table or generated as needed.

The code shown in FIG. 11 represents the server-side generated code from a particular dynamic web page content file, i.e., the file shown in FIG. 10. Once the file shown in FIG. 11 is completed, the file may be compiled as discussed above with respect to operation 610 shown in FIG. 6. The compilation results in a class that can be used to generate the controls of the dynamic web page content file. The class is stored in cache or other memory and may be used as many times as desired to instantiate the objects for the page. Both the compilation and persistence of the resulting class may be done "in-memory" such that there is no need to access the disk, which is generally slower than doing things in memory.

All operations necessary to setup, activate, and run the server-side page are encapsulated within the dynamically compiled page class. As a result, no additional configuration/parsing of files is necessary during page setup. Moreover, the original ".aspx" or ASP+ file is not touched again, and a "runtime host environment," e.g., an ASP script engine is not required during page execution.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. In a server computer system having memory, a method of creating a class in memory, wherein the class is used by the server computer system to create server-side objects for dynamically rendering web page content, the web page content delivered to a client-side computer system and displayed as a web page on the client computer system, said method comprising:

receiving a request from the client specifying a dynamic web page content file;

processing the dynamic web page content file to produce a source code file containing source code that represent control objects declared in the web page content file; and compiling the source code file to produce a class from which a set of hierarchical objects can be instantiated to produce web page authoring language that produces a web page for display.

2. A method as defined in claim 1 wherein the dynamic web page content file is a server-side declaration datastore.

3. A method as defined in claim 1 wherein the class is stored in cache memory on the server computer system and is available to instantiate objects in response to another request specifying the dynamic web page content file.

4. A method as defined in claim 1 wherein the class is stored on a magnetic storage medium and is available to instantiate objects in response to another request specifying the dynamic web page content file.

5. A method as defined in claim 1 wherein the step processing the dynamic web page content file comprises:

parsing the dynamic web page content file to store portions of the file into a data model, wherein the data model comprises a plurality of data objects linked in a hierarchical manner;

generating source code related to declaration information based on an analysis of the data model during a first phase;

writing the source code related to declaration information to the source code file;

generating source code related to control object information based on an analysis of the data model during a second phase; and writing the source code related to control object information to the source code file during the second phase.

6. A method as defined in claim 5 wherein the method further comprises:

generating source code related to rendering information based on an analysis of the data model during a third phase; and writing the source code related to rendering information to the source code file during the third phase.

7. A method as defined in claim 6 wherein the second phase occurs once the first phase is complete and wherein the third phase occurs once the second phase is complete.

8. A method as defined in claim 6 wherein the first, second and third phases occur simultaneously.

9. A method as defined in claim 1 further comprising the following:

prior to the step of processing the dynamic web page content file, determining whether the class related to the received request has been compiled and stored in memory; and if the class has been compiled and stored in memory, skipping the processing step, otherwise continue with the processing step.

10. A computer data signal embodied in a carrier wave by a computing system having memory and encoding a computer program for executing a computer process creating a class in memory, wherein the class is used by the server computer system to create server-side objects for dynamically rendering web page content, the web page content delivered to a client-side computer system and displayed as a web page on the client computer system, said computer process comprising:

receiving a request from the client specifying a dynamic web page content file;

processing the dynamic web page content file to produce a source code file containing source code that represent control objects declared in the web page content file; and compiling the source code file to produce a class from which a set of hierarchical objects can be instantiated to produce web page authoring language that produces a web page for display.

11. A computer program storage medium readable by a computer system having memory and encoding a computer program for executing a computer process creating a class in memory, wherein the class is used by the server computer system to create server-side objects for dynamically rendering web page content, the web page content delivered to a client-side computer system and displayed as a web page on the client computer system, said computer process comprising:

receiving a request from the client specifying a dynamic web page content file;

processing the dynamic web page content file to produce a source code file containing source code that represent control objects declared in the web page content file; and compiling the source code file to produce a class from which a set of hierarchical objects can be instantiated to produce web page authoring language that produces a web page for display.

12. In a server computer system having memory, a method of creating a plurality of web page responses having dynamically rendered web page content, the web page responses delivered to one or more client-side computer systems and displayed as a web pages on the client computer systems, said method comprising:

receiving a request from the client computer system for the web page, wherein the request identifies a dynamic web page content file;

creating a data model to store elements of the dynamic web page content file;

generating a source code file related to the dynamic web page content file based on an evaluation of the data model;

compiling the source code file to create a compiled class in memory;

returning a class reference to the server computer system enabling the server computer system to instantiate server-side processing objects from that class to dynamically generate web page content;

rendering the dynamic web page content into a web page response for delivery to the client computer system;

conducting the web page response to the requesting client computer system;

receiving a second request for the web page for the web page, wherein the request identifies a dynamic web page content file;

determining that a compiled class for that dynamic web page content file resides in memory;

returning a class reference to the server computer system enabling the server computer system to instantiate server-side processing objects from that class to dynamically generate web page content;

rendering the dynamic web page content into a second web page response; and conducting the second web page response to the requesting client computer system.

13. A computer program storage medium readable by a computer system having memory and encoding a computer program for executing a computer process creating a plurality of web page responses having dynamically rendered web page content, the web page responses delivered to one or more client-side computer systems and displayed as a web pages on the client computer systems, said computer process comprising:

receiving a request from the client computer system for the web page, wherein the request identifies a dynamic web page content file;

creating a data model to store elements of the dynamic web page content file;

generating a source code file related to the dynamic web page content file based on an evaluation of the data model;

compiling the source code file to create a compiled class in memory;

returning a class reference to the server computer system enabling the server computer system to instantiate server-side processing objects from that class to dynamically generate web page content;

rendering the dynamic web page content into a web page response for delivery to the client computer system;

conducting the web page response to the requesting client computer system; receiving a second request for the web page, wherein the request identifies a dynamic web page content file;

determining that a compiled class for that dynamic web page content file resides in memory;

returning a class reference to the server computer system enabling the server computer system to instantiate server-side processing objects from that class to dynamically generate web page content;

rendering the dynamic web page content into a second web page response; and conducting the second web page response to the requesting client computer system.

14. A computer data signal embodied in a carrier wave by a computing system having memory and encoding a computer program for executing a computer process creating a plurality of web page responses having dynamically rendered web page content, the web page responses delivered to one or more client-side computer systems and displayed as a web pages on the client computer systems, said computer process comprising:

receiving a request from the client computer system for the web page, wherein the request identifies a dynamic web page content file;

creating a data model to store elements of the dynamic web page content file;

generating a source code file related to the dynamic web page content file based on an evaluation of the data model;

compiling the source code file to create a compiled class in memory;

returning a class reference to the server computer system enabling the server computer system to instantiate server-side processing objects from that class to dynamically generate web page content;

rendering the dynamic web page content into a web page response for delivery to the client computer system;

conducting the web page response to the requesting client computer system;

receiving a second request for the web page for the web page, wherein the request identifies a dynamic web page content file;

determining that a compiled class for that dynamic web page content file resides in memory;

returning a class reference to the server computer system enabling the server computer system to instantiate server-side processing objects from that class to dynamically generate web page content;

rendering the dynamic web page content into a second web page response; and conducting the second web page response to the requesting client computer system.

15. A computer program product encoding a computer program for executing in a computer system a computer process for creating a class in memory, wherein the class is used by a server computer system to create server-side objects for dynamically rendering authoring language elements, the elements are delivered to a client-side computer system and processed on the client computer system, said process comprising:

receiving a request from the client computer system for a resource, wherein the request identifies a dynamic web page resource;

processing the resource to generate a source code file related to the resource; and compiling the source code file to create a compiled class in memory to enable the instantiation of objects of the compiled class.

16. A computer program product encoding a computer program for executing in a computer system a computer process for creating a class in memory as defined in claim 15, wherein the processing step comprises:

parsing the resource to separate the resource into logical elements and identify relationships between the logical elements;

creating a plurality of hierarchically related data structures forming a hierarchical data model; and storing portions of the resource in the data structures.

17. A computer program product encoding a computer program for executing in a computer system a computer process for creating a class in memory as defined in claim 15, wherein the processing step comprises the following steps:

performing a first analysis of the resource to generate source code related to variable declaration information;

performing a second analysis of the resource to generate source code related to control object information;

performing a third analysis of the resource to generate source code related to rendering information; and storing the source code in the source code file.

18. A computer program product encoding a computer program for executing in a computer system a computer process for creating a class in memory as defined in claim 16, wherein the processing step further comprises a step of generating an intermediate data structure, wherein the source code is generated from the intermediate data structure.

19. A computer program product encoding a computer program for executing in a computer system a computer process for creating a class in memory as defined in claim 18, wherein the processing step of generating an intermediate data structure further comprises:

performing a first analysis of the resource to generate intermediate data structure elements related to variable declaration information;

performing a second analysis of the resource to generate intermediate data structure elements related to control object information;

performing a third analysis of the resource to generate intermediate data structure elements related to rendering information; and generating source code from the intermediate data structure.

20. A computer program product encoding a computer program for executing in a computer system a computer process for creating a class in memory as defined in claim 18, wherein the intermediate data structure is a generic description that may be translated into a plurality of source code language files, wherein at least one source code language file is different from another source code language file.

21. A method comprising:

receiving a request from a client computer system, the request specifying a dynamic web page content file on a server computer system;

processing the dynamic web page content file to produce source code representing one or more server-side control objects declared in the web page content file; and compiling the source code to produce one or more classes from which a plurality of server-side control objects are instantiated into a control object hierarchy on the server computer system to produce web page authoring language representing a web page for display.

22. A computer program product encoding a computer program for executing in a computer system a computer process, the computer process comprising:

receiving a request from a client computer system, the request specifying a dynamic web page content file on a server computer system;

processing the dynamic web page content file to produce source code representing one or more server-side control objects declared in the web page content file; and compiling the source code to produce a class from which a server-side control object is instantiated on the server computer system to produce web page authoring language representing a web page for display.

* * * * *

UNITED STATES PATENT AND TRADEMARK OFFICE
CERTIFICATE OF CORRECTION

| | |
|---|---|
| PATENT NO. | : 6,990,653 B1 |
| APPLICATION NO. | : 09/573768 |
| DATED | : January 24, 2006 |
| INVENTOR(S) | : Gary S. Burd et al. |

It is certified that error appears in the above-identified patent and that said Letters Patent is hereby corrected as shown below:

On the title page, item (56), under "U.S. Patent Documents", in column 1, line 6, after "5,940,075 A 8/1999 Mutschler, III et al." insert -- 5,953,524 09/14/99 Meng et al. 395/701 --.

On the title page, item (56), under "U.S. Patent Documents", in column 1, line 8, after "5,983,227 A 11/1999 Nazem et al." insert -- 5,991,802 11/23/99 Allard et al. 709/219 --.

On the title page, item (56), under "Other Publications", in column 2, line 3, after "1999" insert -- , --.

On the title page, item (56), under "Other Publications", in column 2, line 3, delete "retrived" and insert -- retrieved --, therefor.

On the title page, item (56), under "Other Publications", in column 2, line(s) 13-14, delete "nt-security-nt/security.html" and insert -- nt-security/nt-security.html. --, therefor.

On page 2, item (56), under "Other Publications", in column 1, line 3, delete "Priciple" and insert -- Principle --, therefor.

On page 2, item (56), under "Other Publications", in column 1, line 8, delete "5pgs" and insert -- 5 pgs --, therefor.

On page 2, item (56), under "Other Publications", in column 1, line 11, after "Dapeng" insert -- ; --.

On page 2, item (56), under "Other Publications", in column 1, line 11, after "Yiwci" delete ",".

On page 2, item (56), under "Other Publications", in column 1, line 16, after "Gerald" delete "," and insert -- ; --, therefor.

UNITED STATES PATENT AND TRADEMARK OFFICE
CERTIFICATE OF CORRECTION

PATENT NO. : 6,990,653 B1
APPLICATION NO. : 09/573768
DATED : January 24, 2006
INVENTOR(S) : Gary S. Burd et al.

It is certified that error appears in the above-identified patent and that said Letters Patent is hereby corrected as shown below:

On page 2, item (56), under "Other Publications", in column 1, line 16, after "Luo" delete ";" and insert -- , --, therefor.

On page 2, item (56), under "Other Publications", in column 1, line 31, after "Access" delete ";" and insert -- : --, therefor.

On page 2, item (56), under "Other Publications", in column 1, line 32, delete "Netorking" and insert -- Networking --, therefor.

On page 2, item (56), under "Other Publications", in column 2, line 5, after "Corporation" delete "," and insert -- ; --, therefor.

On page 2, item (56), under "Other Publications", in column 2, line 35, delete "Encyclopedia" and insert -- Encyclopaedia --, therefor.

On page 2, item (56), under "Other Publications", in column 2, line 46, delete "Server– Side" and insert -- Server–Side --, therefor.

On page 2, item (56), under "Other Publications", in column 2, line 46, delete "Online!" and insert -- 'Online! --, therefor.

On page 2, item (56), under "Other Publications", in column 2, line 48, delete "ssjs1" and insert -- ssjs/1 --, therefor.

On page 2, item (56), under "Other Publications", in column 2, line 48, after "4/ssjs.pdf" delete ">".

On page 2, item (56), under "Other Publications", in column 2, line 49, delete "Server– Side" and insert -- Server–Side --, therefor.

On page 2, item (56), under "Other Publications", in column 2, line 50, delete "Online" and insert -- 'Online --, therefor.

On page 2, item (56), under "Other Publications", in column 2, line 51, after "4/ssjs.pdf" delete ">".

UNITED STATES PATENT AND TRADEMARK OFFICE
CERTIFICATE OF CORRECTION

PATENT NO. : 6,990,653 B1
APPLICATION NO. : 09/573768
DATED : January 24, 2006
INVENTOR(S) : Gary S. Burd et al.

It is certified that error appears in the above-identified patent and that said Letters Patent is hereby corrected as shown below:

On page 2, item (56), under "Other Publications", in column 2, line 53, delete "W W W" and insert -- WWW --, therefor.

In column 7, line 10, delete ""file not found"error message" and insert -- "file not found" error message --, therefor.

In column 8, line(s) 18-26, delete "FIG. illustrates contents of an exemplary dynamic content file in an embodiment of the present invention. In the illustrated embodiment, the file 400 contains plain-text declarations in an exemplary dynamic content file format (e.g., ASP+). Each declaration provides instructions to the page factory module 308 that reads the file 400, creates the class, invokes the appropriate server-side control objects which ultimately render HTML code or any other authoring language for transmission to the client in an HTTP response." and insert -- FIG. illustrates contents of an exemplary dynamic content file in an embodiment of the present invention. In the illustrated embodiment, the file 400 contains plain-text declarations in an exemplary dynamic content file format (e.g., ASP+). Each declaration provides instructions to the page factory module 308 that reads the file 400, creates the class, invokes the appropriate server-side control objects which ultimately render HTML code or any other authoring language for transmission to the client in an HTTP response. --, therefor, on line 18. (as a new paragraph)

In column 8, line 52, below ""externalfile]>"" insert -- ................... --.

In column 9, line 43, delete "<font size="<%=x %>">" and insert -- <font size="<%=x%>"> --, therefor.

In column 9, line 43, delete "<%=Name %>," and insert -- <%=Name%>, --, therefor.

In column 9, line 44, delete "<%=Age %>!" and insert -- <"%=Age%>! --, therefor.

In column 10, line 49, below "<HTMLTag id="Optional Name" runat=server>" insert -- ................... --.

UNITED STATES PATENT AND TRADEMARK OFFICE
CERTIFICATE OF CORRECTION

PATENT NO. : 6,990,653 B1
APPLICATION NO. : 09/573768
DATED : January 24, 2006
INVENTOR(S) : Gary S. Burd et al.

It is certified that error appears in the above-identified patent and that said Letters Patent is hereby corrected as shown below:

In column 11, line 21, delete "MyButton" and insert -- "MyButton" --, therefor.

In column 11, line 44, delete "servercnlrlclassname" and insert
-- servercntrlclassname --, therefor.

In column 11, line 53-54, delete "narne-space" and insert -- name-space --, therefor.

In column 14, line 65, after "expressions" insert -- , --.

In column 14, line(s) 41-51, delete "However, if test operation 708 determines that there are more declarations, then flow branches YES to get operation 710 which gets the next declaration. Followings get operation 710, store operation 708 stores information related to next declaration as described above. These steps 708, 710, and 712 continue until all declarations are retrieved in a sequential manner and stored in data structures. The data structures may be linked together in a hierarchical manner wherein nested objects, children, nodes or sub-elements of parent objects, are connected so that they are identifiable as sub-elements." and insert -- However, if test operation 708 determines that there are more declarations, then flow branches YES to get operation 710 which gets the next declaration. Followings get operation 710, store operation 708 stores information related to next declaration as described above. These steps 708, 710, and 712 continue until all declarations are retrieved in a sequential manner and stored in data structures. The data structures may be linked together in a hierarchical manner wherein nested objects, children, nodes or sub-elements of parent objects, are connected so that they are identifiable as sub-elements. --, therefor, on line 40 after "of the process." (as a continuation of the paragraph)

In column 20, line 39, delete "<script>" and insert -- </script> --, therefor.

In column 21, line 17, after ""MyList"" insert -- . --.

In column 24, line(s) 30-31, in Claim 12, after "web page" delete "for the web page". (Second Occurrence)

UNITED STATES PATENT AND TRADEMARK OFFICE
CERTIFICATE OF CORRECTION

PATENT NO. : 6,990,653 B1
APPLICATION NO. : 09/573768
DATED : January 24, 2006
INVENTOR(S) : Gary S. Burd et al.

It is certified that error appears in the above-identified patent and that said Letters Patent is hereby corrected as shown below:

In column 25, line(s) 43-44, in Claim 14, after "web page" delete "for the web page". (Second Occurrence)

Signed and Sealed this

Fourth Day of August, 2009

JOHN DOLL
*Acting Director of the United States Patent and Trademark Office*